United States Patent
Iwata et al.

(10) Patent No.: US 9,731,723 B2
(45) Date of Patent: Aug. 15, 2017

(54) WORKING VEHICLE

(71) Applicant: YANMAR CO., LTD., Osaka-shi, Osaka (JP)

(72) Inventors: Akimichi Iwata, Osaka (JP); Hiroshi Isobe, Osaka (JP)

(73) Assignee: Yanmar Co., Ltd., Osaka (JP)

( * ) Notice: Subject to any disclaimer, the term of this patent is extended or adjusted under 35 U.S.C. 154(b) by 0 days.

(21) Appl. No.: 15/277,682

(22) Filed: Sep. 27, 2016

(65) Prior Publication Data
US 2017/0015326 A1    Jan. 19, 2017

Related U.S. Application Data

(63) Continuation of application No. PCT/JP2015/059521, filed on Mar. 26, 2015.

(30) Foreign Application Priority Data

Mar. 27, 2014  (JP) .................. 2014-065898
Mar. 27, 2014  (JP) .................. 2014-065899

(51) Int. Cl.
| | |
|---|---|
| *B60W 30/18* | (2012.01) |
| *F01N 3/021* | (2006.01) |
| *B60W 10/06* | (2006.01) |
| *B60W 10/184* | (2012.01) |
| *F01N 3/10* | (2006.01) |

(Continued)

(52) U.S. Cl.
CPC ...... *B60W 30/18109* (2013.01); *B60W 10/06* (2013.01); *B60W 10/184* (2013.01);
(Continued)

(58) Field of Classification Search
None
See application file for complete search history.

(56) References Cited

U.S. PATENT DOCUMENTS 4,470,257 A * 9/1984 Wescott .................... F02C 9/28
                                                          60/39.281
8,484,969 B2 * 7/2013 Shiomi ................. F02D 31/003
                                                          123/352
(Continued)

FOREIGN PATENT DOCUMENTS

| JP | 3-275960 A | 12/1991 |
| JP | 2006-348889 A | 12/2006 |

(Continued)

*Primary Examiner* — Colby M Hansen
(74) *Attorney, Agent, or Firm* — Norris McLaughlin & Marcus, P.A.

(57) ABSTRACT

A working vehicle includes an engine, a pair of right and left traveling portions rotated by a power of the engine, a pair of right and left brake operation devices for respectively operating to brake the traveling portions, an engine controller which controls driving of the engine, and a control mode selection switch which can alternatively select the isochronous control and the droop control. The engine controller selects any of an isochronous control and a droop control so as to control the engine. In the case that the isochronous control is designated by the control mode selection switch, the engine is controlled according to the isochronous control when one of the right and left brake operation devices is under a non-operation state, and the engine is controlled according to the droop control when both of the right and left brake operation devices are under an operation state.

6 Claims, 23 Drawing Sheets

(51) Int. Cl.
     *F02D 29/02*    (2006.01)
     *F02D 41/14*    (2006.01)
     *F02D 41/02*    (2006.01)
     *B60K 13/04*    (2006.01)
     *F02M 26/41*    (2016.01)
     *F02M 26/47*    (2016.01)

(52) U.S. Cl.
     CPC ............ *F01N 3/021* (2013.01); *F01N 3/103* (2013.01); *F02D 29/02* (2013.01); *F02D 41/029* (2013.01); *F02D 41/1448* (2013.01); *F02M 26/41* (2016.02); *B60K 13/04* (2013.01); *B60W 2510/18* (2013.01); *B60W 2710/06* (2013.01); *B60Y 2200/221* (2013.01); *F02D 2200/0812* (2013.01); *F02M 26/47* (2016.02)

(56) References Cited

U.S. PATENT DOCUMENTS

| | | |
|---|---|---|
| 2009/0265082 A1 | 10/2009 | Nishi et al. |
| 2012/0312276 A1 | 12/2012 | Furuichi |
| 2016/0208665 A1* | 7/2016 | Koike .................. F02D 41/029 |

FOREIGN PATENT DOCUMENTS

| | | |
|---|---|---|
| JP | 2009-257181 A | 5/2009 |
| JP | 2013-002284 A | 1/2013 |
| JP | 2013-126829 A | 6/2013 |
| JP | 2013-155706 A | 8/2013 |

\* cited by examiner

WORKING VEHICLE

CROSS-REFERENCE TO RELATED APPLICATIONS

The present application is a continuation application of International Application No. PCT/JP2015/059521, filed Mar. 26, 2015, which claims priority to Japanese Patent Application No. 2014-065898, filed Mar. 27, 2014, and Japanese Patent Application No. 2014-065899, filed Mar. 27, 2014. The contents of these applications are incorporated herein by reference in their entirety.

BACKGROUND OF THE INVENTION

The present invention relates to a working vehicle such as a tractor for a farm work or a wheel loader for a civil engineering work.

In recent years, in connection with application of emission control of a high order relating to a diesel engine (hereinafter, refer simply to as an engine), it has been demanded to mount an exhaust gas purification device purifying air pollutant in the exhaust gas to a farm work vehicle and a construction and civil engineering machinery to which the engine is mounted. As the exhaust gas purification device, there has been known a diesel particulate filter (an exhaust gas purification device) which collects particulate matters in the exhaust gas (for example, see Japanese Unexamined Patent Application Publication No. 2013-155706).

The working vehicle mounting the engine thereto is controlled in an integrated manner by being allocated to a plurality of controllers in relation to the traveling series system and the engine to be controlled, and being structured such as to be communicated with each other (for example, see Japanese Unexamined Patent Application Publication No. 2013-126829). Further, in the working vehicle, there are an isochronous control which controls an engine rotation speed so that an output is fixed regardless of a load fluctuation of the engine, and a droop control which changes the engine rotation speed in correspondence to a load, as a control method of the engine (for example, see Japanese Unexamined Patent Application Publication No. 2013-002284).

SUMMARY OF THE INVENTION

In the case that the exhaust gas purification device is mounted to the engine, a position for arranging the engine to an engine room of the working vehicle is restricted since the exhaust gas purification device is greater and heavier than a conventional exhaust muffler. As a result, an engine controller controlling the engine is desirably attached along the vicinity of the engine. However, the engine controller has no freedom of an installation position thereof since the engine controller is installed according to the layout of the engine. Further, since an exhaust heat temperature generated by the exhaust gas purification device is high, the engine controller necessarily avoids an influence of the exhaust heat generated by the exhaust gas purification device. Further, since the engine controller is affected its operation by a low-frequency oscillation, the engine controller is desirably arranged at a position which is less affected by the oscillation from the engine.

Further, in the working vehicle, since the engine rotation speed can be fixed by controlling the engine according to the isochronous control regardless of a work load, it is possible to regulate a vehicle speed without applying any uncomfortable feeling to an operator. However, the isochronous control is hard to regulate a speed which the operator expects in the case of finely regulating a speed change, in comparison with the droop control. Particularly, since deceleration caused by operating a brake in the isochronous control reacts in retard of the operation of the operator, a gap is generated between an operation feeling of the operator and an operation of the working vehicle, thereby making the operator feel bad operability.

A technical object of the present invention is to provide a working vehicle to which an improvement is applied by making a study of the actual conditions mentioned above.

A first aspect of the present invention is a working vehicle including an engine which is mounted to a travel machine body, a pair of right and left traveling portions which are rotated by a power of the engine, a pair of right and left brake operation devices for respectively operating to brake the pair of right and left traveling portions, an engine controller which controls driving of the engine, and the engine controller selecting any of an isochronous control and a droop control so as to control the engine, wherein the working vehicle has a control mode selection switch which can alternatively select the isochronous control and the droop control, and in the case that the isochronous control is designated by the control mode selection switch, the engine is controlled according to the isochronous control when one of the right and left brake operation devices is under a non-operation state, and the engine is controlled according to the droop control when both of the right and left brake operation devices are under an operation state.

A second aspect of the present invention is the working vehicle according to the first aspect, wherein the engine controller may store a predetermined rotation speed in addition to a high idling rotation speed based on a rated rotation speed of the engine, and the engine controller may set the predetermined rotation speed to the high idling rotation speed in the case that the isochronous control is designated by the control mode selection switch and both of the right and left brake operation devices are under the operation state.

A third aspect of the present invention is the working vehicle according to the first aspect that may further include a meter controller which displays a driving operation condition of the travel machine body, wherein the control mode selection switch may be electrically connected to the meter controller, and an operation state of the brake operation device may be informed the meter controller.

A fourth aspect of the present invention is the working vehicle according to the third aspect, wherein the engine controller may store a first rotation speed as the high idling rotation speed for the isochronous control, and set the high idling rotation speed of the engine to the first rotation speed in the case that the isochronous control is designated by the engine control selector switch via the driving controller.

A fifth aspect of the present invention is the working vehicle according to the third aspect that may further include a driving operation display device which is controlled by the meter controller and displays a driving operation condition of the travel machine body, wherein the control mode selection switch may be installed at a position which is outside the driving operation display device.

A sixth aspect of the present invention is the working vehicle according to the third aspect that may further include a forward and backward movement switching lever for operating to switch a traveling direction of the travel machine body to a forward travel and a backward travel, and an erroneous operation prevention body which covers the forward and backward movement switching lever from a lower side, wherein the control mode selection switch may be installed on the erroneous operation prevention body.

According to the embodiment of the present invention, in the working vehicle having the engine which is mounted to the travel machine body, the pair of right and left traveling portions which are rotated by the power of the engine, the pair of right and left brake operation devices for respectively operating to brake the pair of right and left traveling portions, and the engine controller which controls driving of the engine, and structured such that the engine controller selecting any of the isochronous control and the droop control so as to control the engine, the working vehicle has the control mode selection switch which can alternatively select the isochronous control and the droop control, and in the case that the isochronous control is designated by the control mode selection switch, the engine is controlled according to the isochronous control when one of the right and left brake operation devices is under the non-operation state, and the engine is controlled according to the droop control when both of the right and left brake operation devices are under the operation state. As a result, it is possible to switch the control mode of the engine by detecting whether or not it is in the traveling state, on the basis of with or without the brake operation, for example, in a loader work. Therefore, an operability is better for the operator, and it is possible to drive without any uncomfortable feeling even under the isochronous control. Further, the engine can be driven by a fixed rotation speed according to the isochronous control at the traveling time, and the engine can be driven in correspondence to the load according to the droop control at the working time.

Further, according to the embodiment of the present invention, the engine controller stores the predetermined rotation speed in addition to the high idling rotation speed based on the rated rotation speed of the engine, and the engine controller sets the predetermined rotation speed to the high idling rotation speed in the case that the isochronous control is designated by the control mode selection switch and both of the right and left brake operation devices are under the operation state. As a result, even in the case that the droop control is executed by the brake operation when the isochronous control is designated, it is possible to achieve prevention of engine stall and improvement of a fuel consumption by setting the high idling rotation speed to the rotation speed in conjunction with the isochronous control.

According to the embodiment of the present invention, the engine controller stores the first rotation speed as the high idling rotation speed for the isochronous control, and sets the high idling rotation speed of the engine to the first rotation speed in the case that the isochronous control is designated by the engine control selector switch via the driving controller. As a result, even in the case that the droop control is executed by the brake operation when the isochronous control is designated, it is possible to achieve the prevention of the engine stall and the improvement of the fuel consumption by setting the high idling rotation speed to the rotation speed in conjunction with the isochronous control.

According to the embodiment of the present invention, the working vehicle further has the driving operation display device which is controlled by the meter controller and displays the driving operation condition of the travel machine body, the control mode selection switch is installed at the position which is outside the driving operation display device. As a result, since the control mode selection switch is arranged in the vicinity of the driving operation display portion, the operator can operate the control mode selection switch in a state in which the operator views the display of the control mode selection switch drive operation display portion. Therefore, it is possible to prevent an erroneous operation of the operator in relation to the control mode selection switch.

According to the embodiment of the present invention, the working vehicle further has the forward and backward movement switching lever for operating to switch the traveling direction of the travel machine body to the forward travel and the backward travel, and the erroneous operation prevention body which covers the forward and backward movement switching lever from the lower side, the control mode selection switch is installed on the erroneous operation prevention body. As a result, the operator can easily operate the control mode selection switch in the case that the forward and backward movement switching lever is used at a higher frequency, for example, in the loader work, since the control mode selection switch is arranged in the vicinity of the forward and backward movement switching lever.

DESCRIPTION OF THE EMBODIMENTS

A description will be given below of embodiments obtained by embodying the present invention with reference to the accompanying drawings, by exemplifying a tractor which is a working vehicle.

Figure 1:
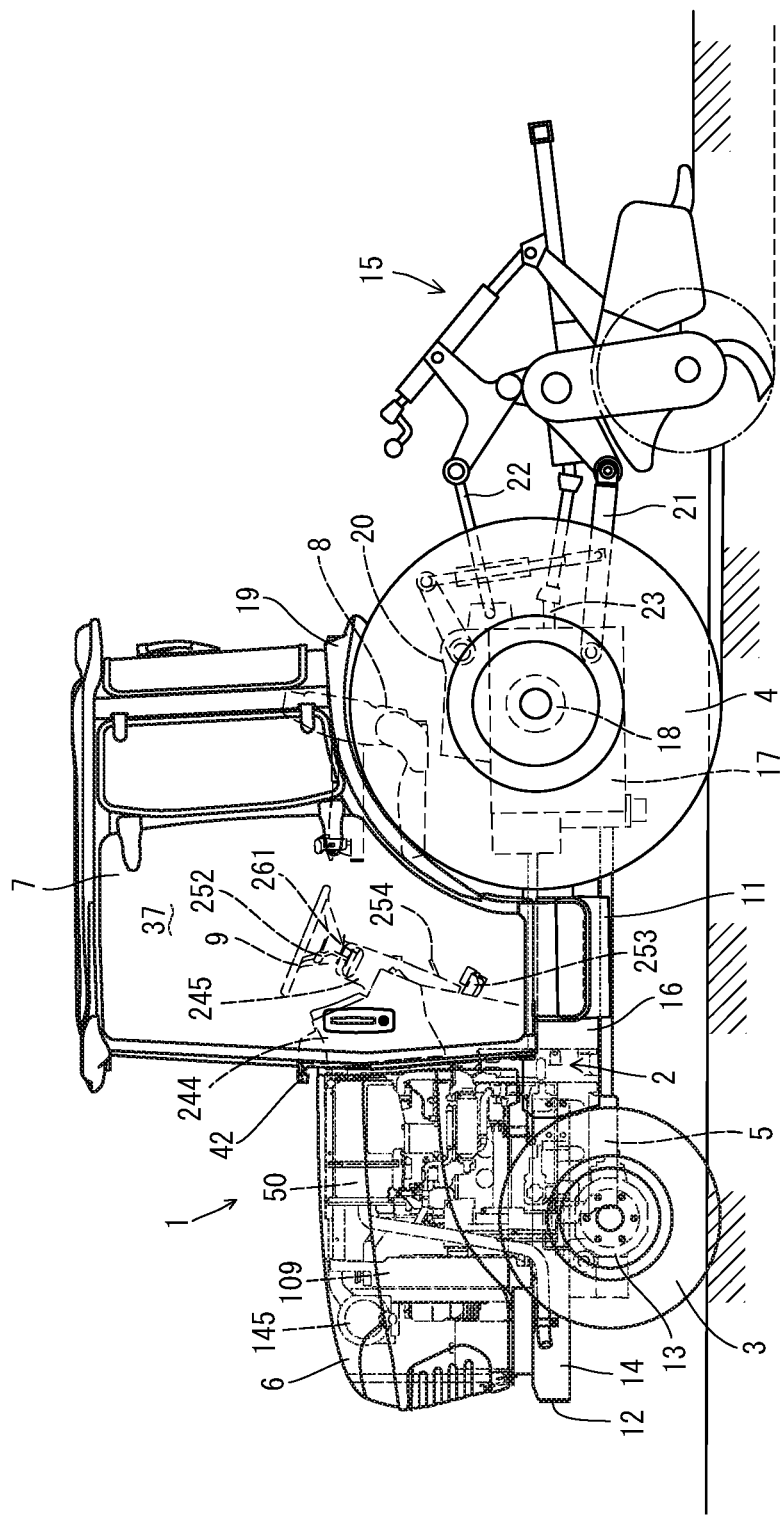
FIG. 1 is a left side elevational view of a tractor.
Figure 2:
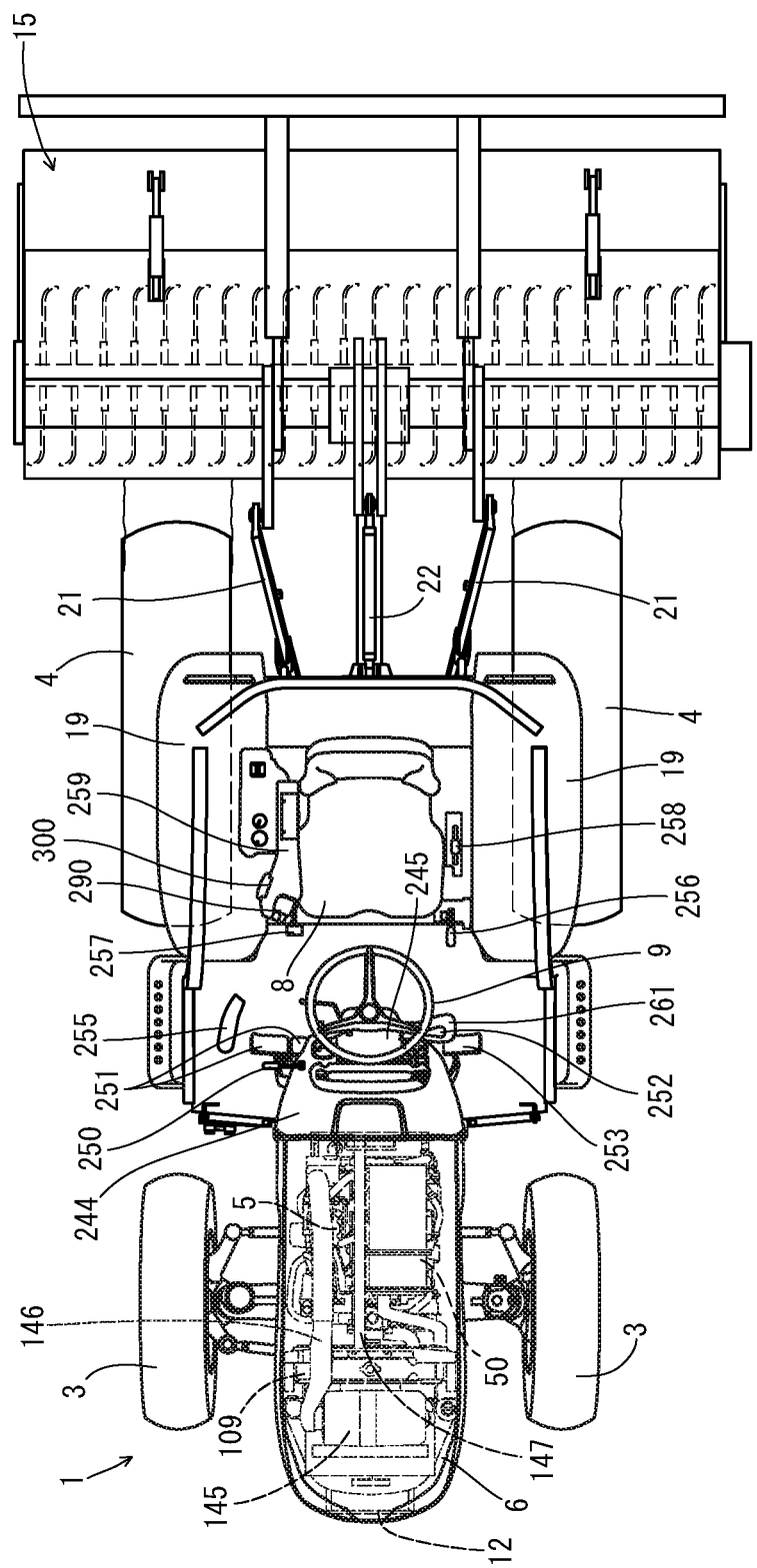
FIG. 2 is a plan view of the tractor.
Figure 3:
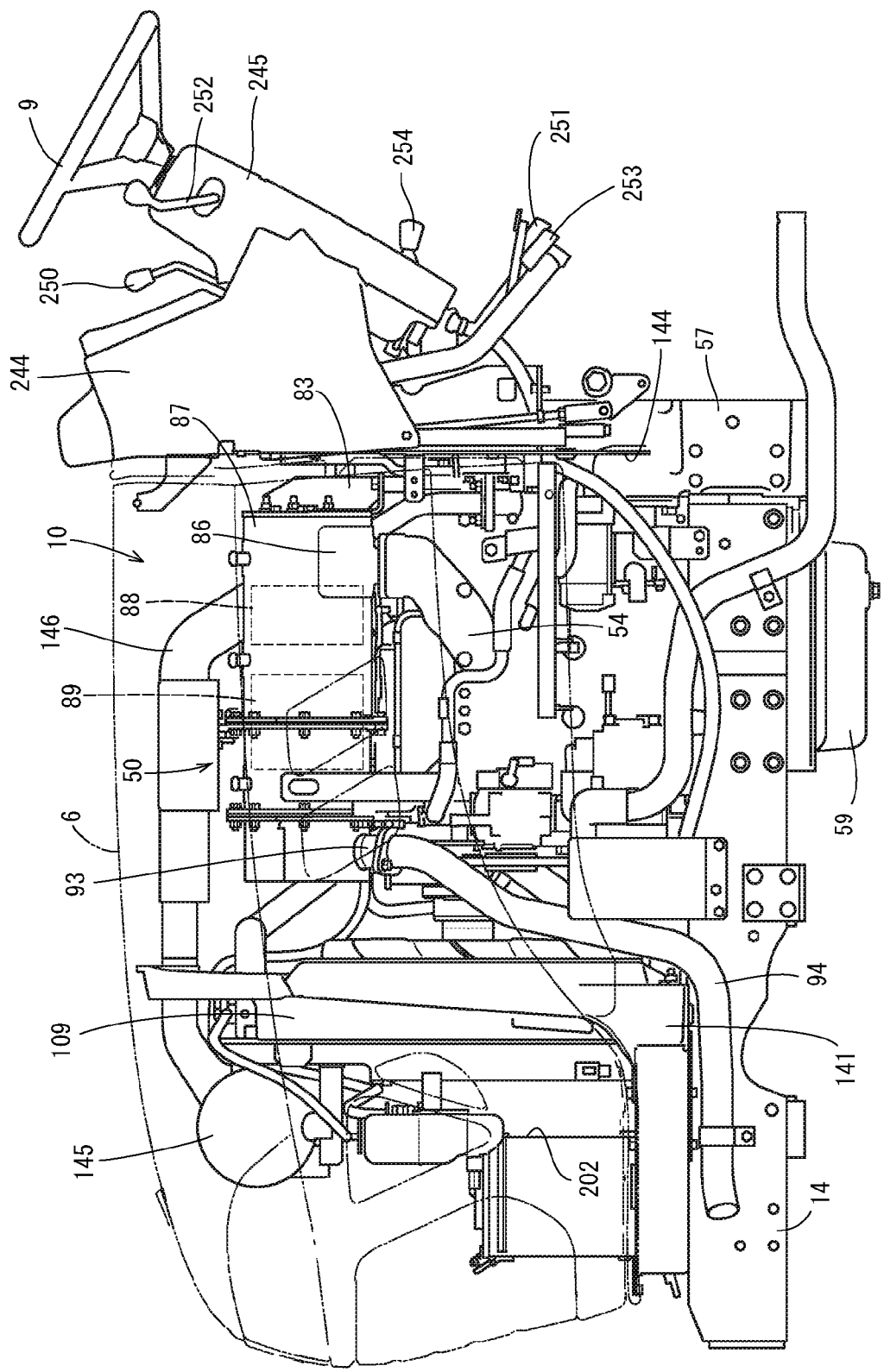
FIG. 3 is a left side elevational view of an engine portion.
Figure 4:
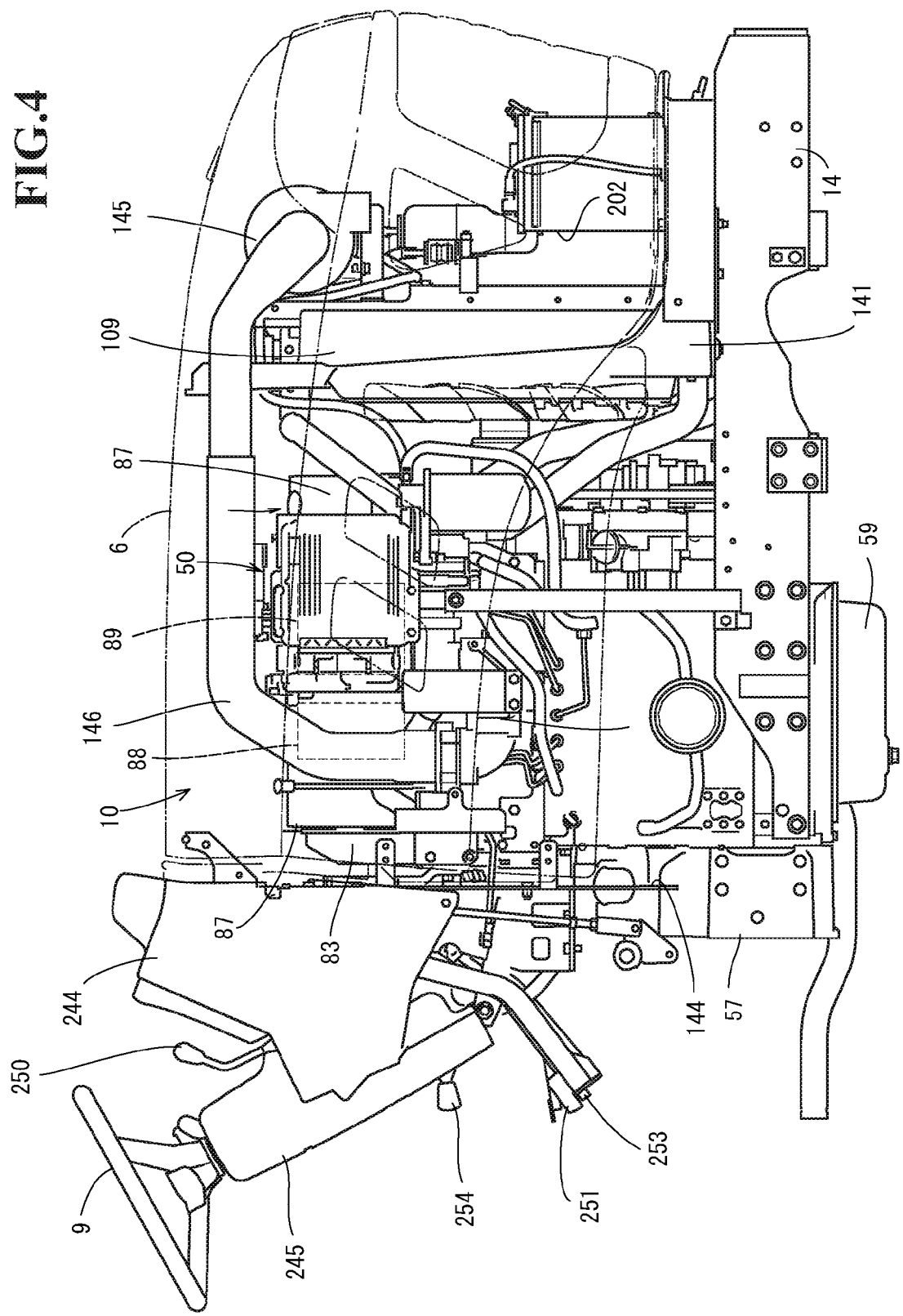
FIG. 4 is a right side elevational view of the engine portion.
Figure 5:
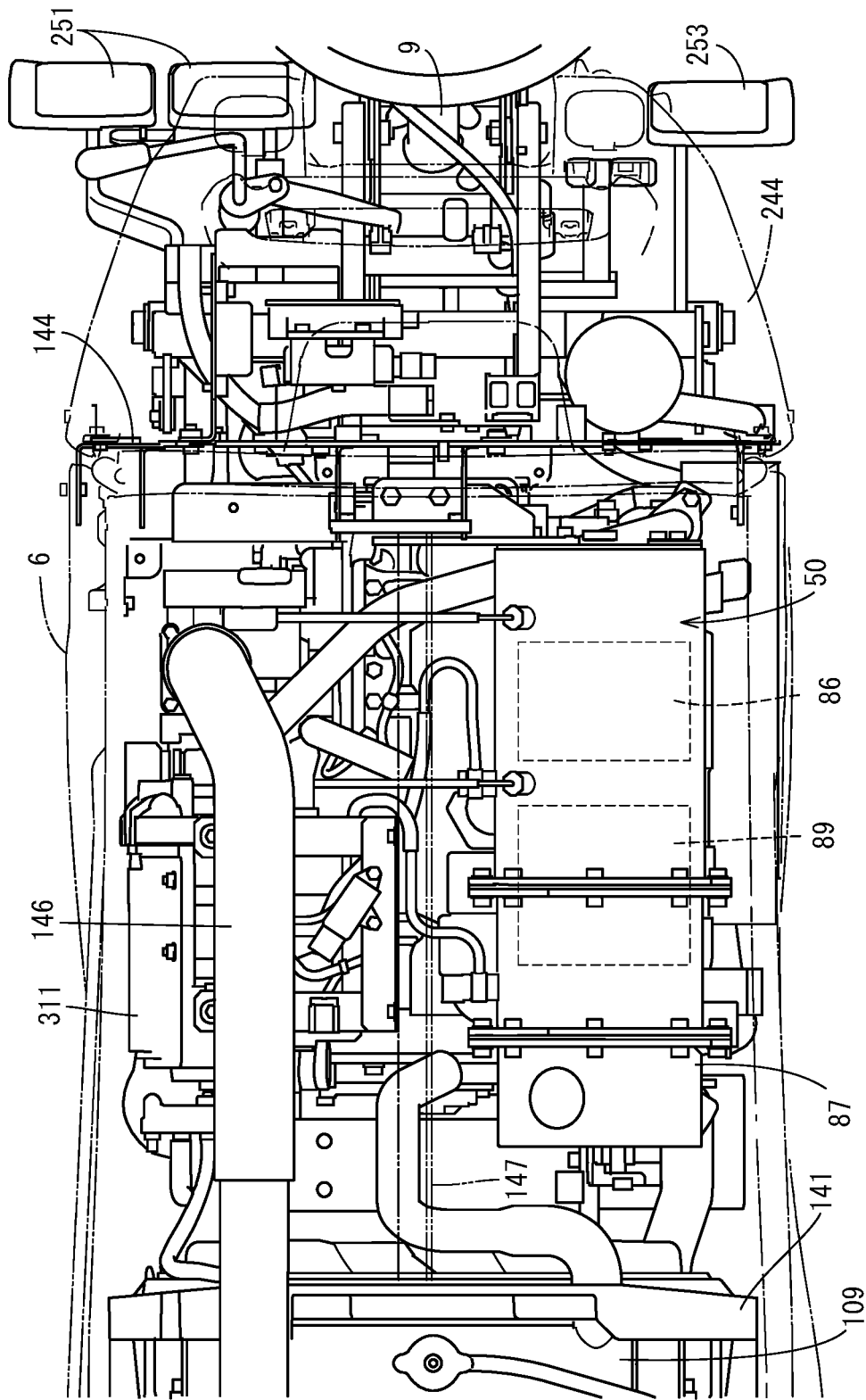
FIG. 5 is a plan view of the engine portion.
Figure 6:
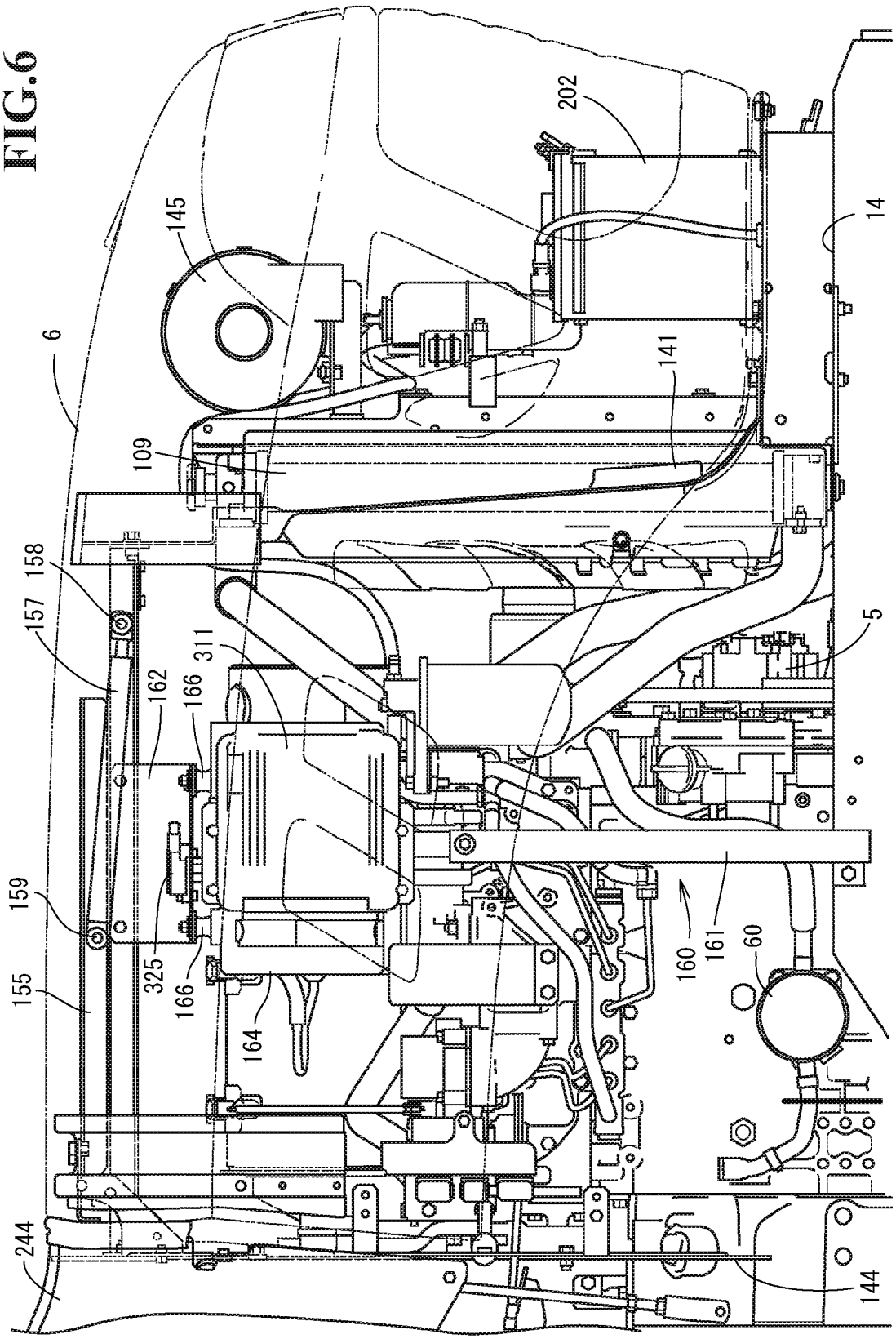
FIG. 6 is an enlarged explanatory view of FIG. 4.
Figure 7:
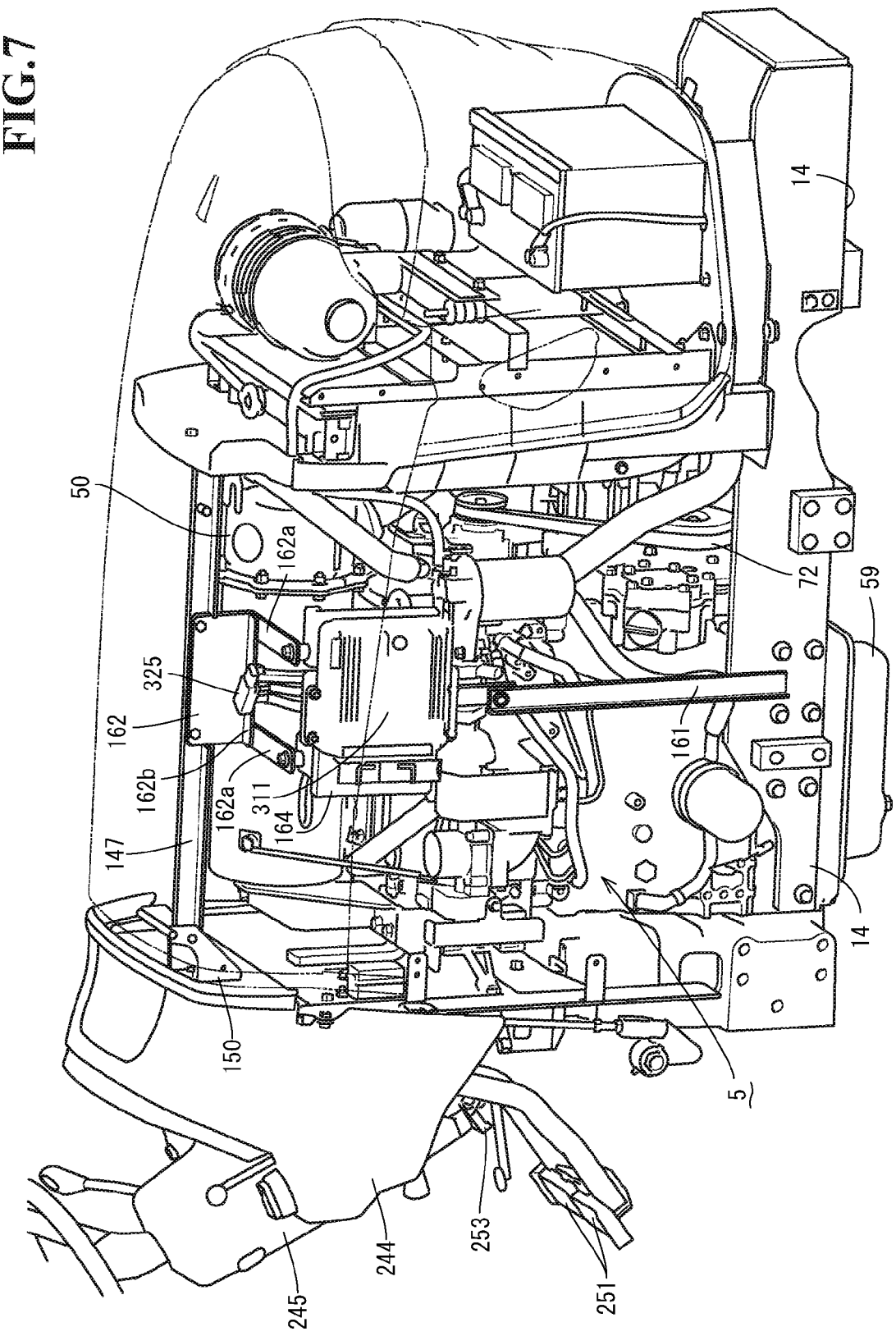
FIG. 7 is a perspective view of the engine portion as seen from a right side in a forward direction.
Figure 8:
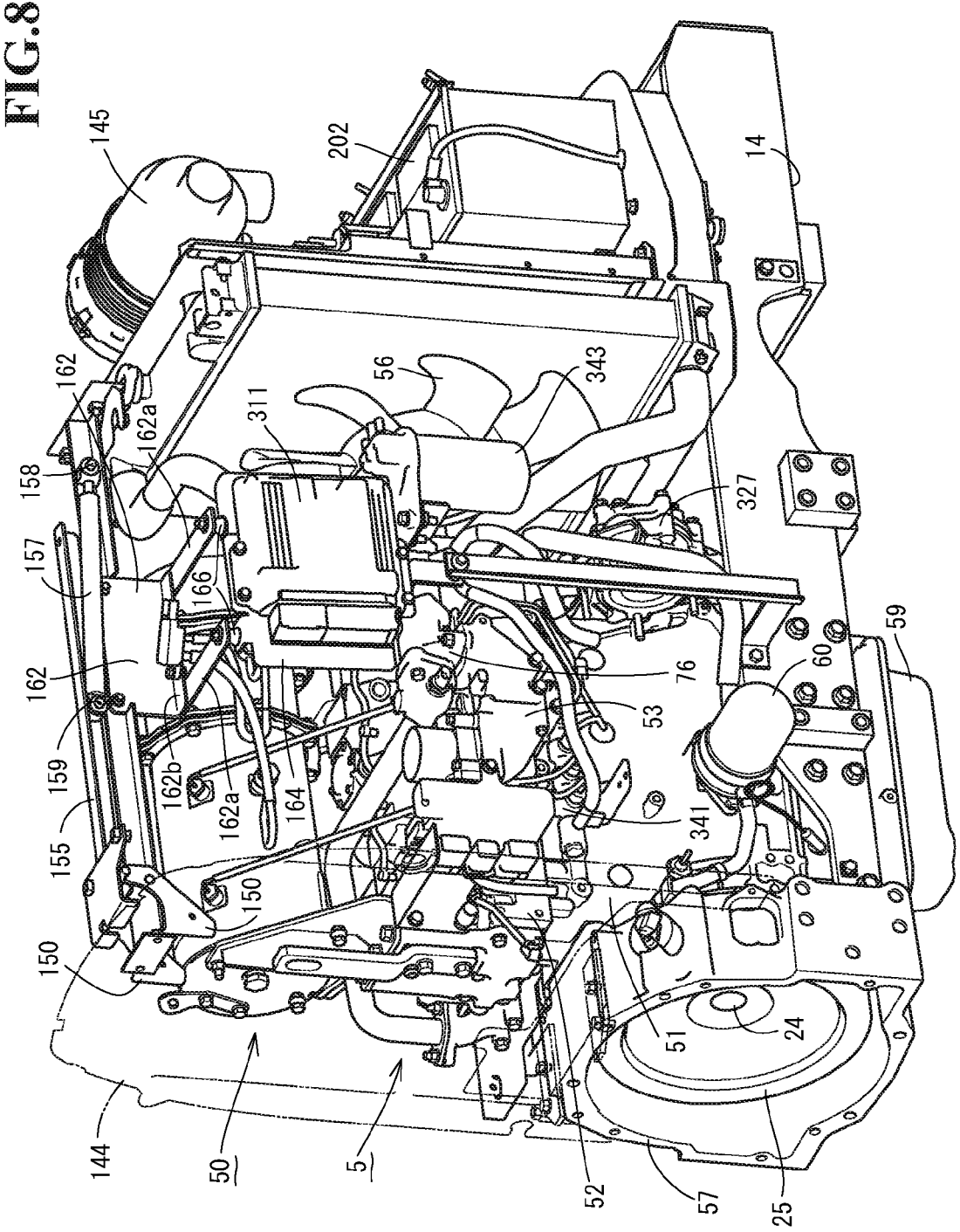
FIG. 8 is a perspective view of the engine portion as seen from a right side in a backward direction.
Figure 9:
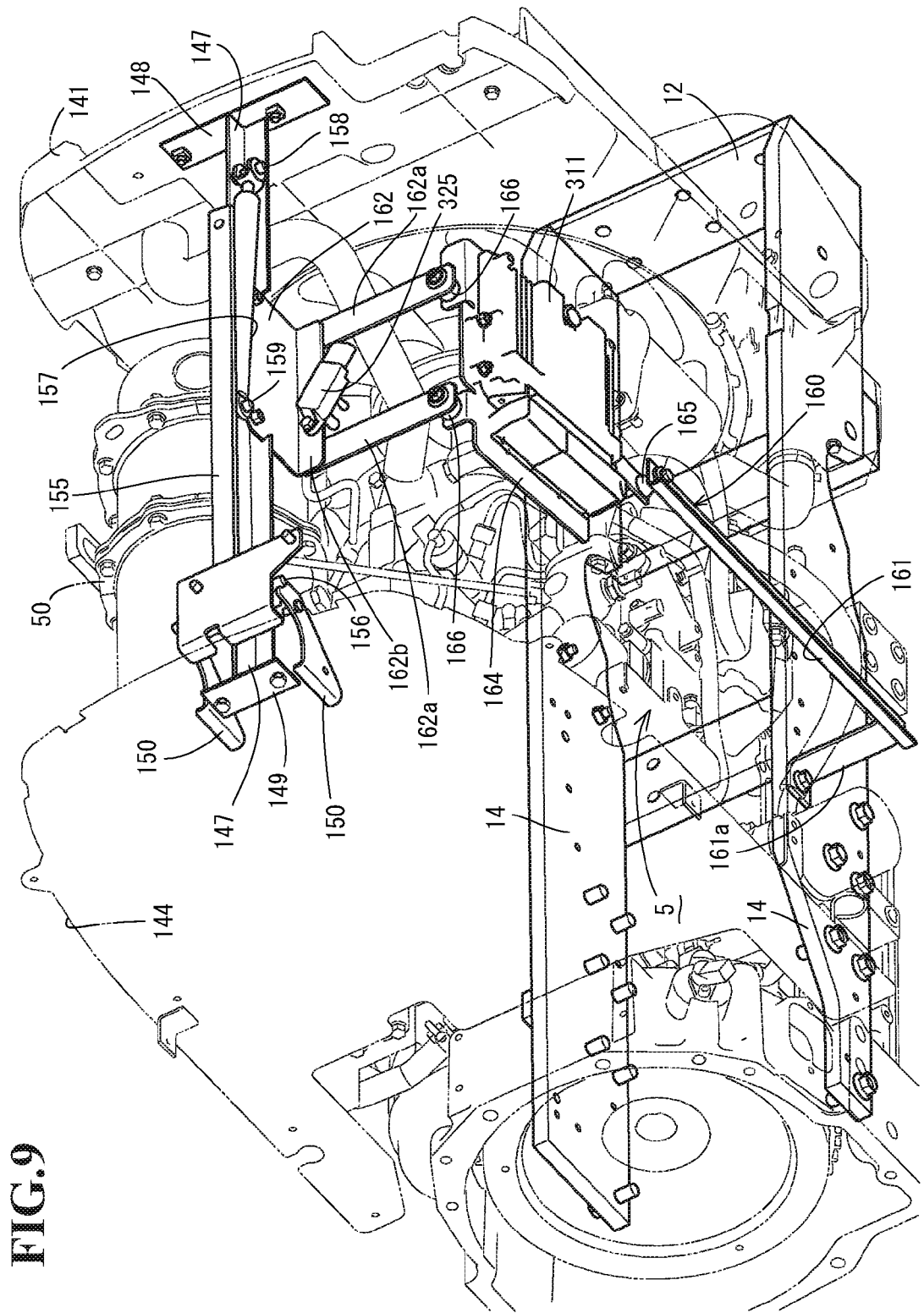
FIG. 9 is a perspective view showing a relationship between a control support body and an engine frame.

First of all, a description will be given of an outline of a tractor with reference to FIGS. 1 and 2. A travel machine body 2 of a tractor 1 is supported by a pair of right and left front wheels 3 and rear wheels 4. The tractor 1 is structured such as to forward and backward travel by driving the rear wheels 4 (the front wheels 3) by a diesel engine 5 (hereinafter, refer simply to as an engine) which is mounted to a front portion of the travel machine body 2. The engine 5 is covered with a hood 6. A cabin 7 is placed in an upper surface of the travel machine body 2, and a control seat 8 and a control steering wheel 9 operating to steer the front wheels 3 are arranged in an inner portion of the cabin 7. A fuel tank 11 supplying fuel to the engine 5 is provided in a lower side of a bottom portion of the cabin 7. An illustration of the cabin is omitted in FIG. 2 as a matter of convenience.

The travel machine body 2 is constructed by an engine frame 14 which is provided with a front bumper 12 and a front axle case 13, and right and left machine body trunk frames 16 which are fixed to a rear portion of the engine frame 14. A transmission case 17 for transmitting a rotative power from the engine 5 to the rear wheels 4 (the front wheels 3) while appropriately changing speed is mounted to a rear portion of the machine body trunk frames 16. The rear wheels 4 is attached to the transmission case 17 via rear axle cases 18 which are installed so as to protrude outward from an outer surface of the transmission case 17. The above of the right and left rear wheels 4 is covered with a fender 19 which is fixed to the machine body trunk frames 16.

A hydraulic elevating mechanism 20 for moving up and down a rotary tiller 15 serving as a working portion is detachably mounted to an upper surface of the rear portion of the transmission case 17. The rotary tiller 15 is coupled to the rear portion of the transmission case 17 via a three-point link mechanism which is constituted by a pair of right and left lower links 21 and a top link 22. A PTO shaft 23 for transmitting a PTO driving force to the rotary tiller 15 is provided in a rear side surface of the transmission case 17 so as to protrude rearward.

Next, a description will be given of an outline structure of the common rail type diesel engine 5 in the embodiment with reference to FIGS. 3 to 8. In the following description, an arranged side of a cooling fan 56 is called as a front side, an arranged side of a flywheel 25 is called as a rear side, an arranged side of an exhaust manifold 54 is called as a left side, and an arranged side of an intake air manifold 53 is called as a right side, and they are set to standards for positional relationships in four directions and up-and-down directions in the engine 5 for convenience.

As shown in FIGS. 3 to 8, the engine 5 mounted to the tractor 1 (the working vehicle) is provided with a continuous regeneration type exhaust gas purification device 50 (DPF). The particulate matters (PM) in the exhaust gas discharged out of the engine 5 is removed by the exhaust gas purification device 50, and carbon monoxide (CO) and carbon hydride (HC) in the exhaust gas are reduced thereby.

The engine 5 is provided with a cylinder block 51 which has an engine output shaft 24 (a crank shaft) and a piston (not shown) built-in. A cylinder head 52 is mounted on the cylinder block 51. An intake air manifold 53 is arranged in a right side surface of the cylinder head 52. An exhaust manifold 54 is arranged in a left side surface of the cylinder head 52. In other words, the intake air manifold 53 and the exhaust manifold 54 are arranged in a sorting manner in both side surfaces along the engine output shaft 24 in the engine 5. A cooling fan 56 is provided in a front surface of the cylinder block 51. The rotative power is transmitted to the cooling fan 56 from a front end side of the engine output shaft 24 via a V belt 72.

A flywheel housing 57 is provided in a rear surface of the cylinder block 51. A flywheel 25 is arranged within the flywheel housing 57. The flywheel 25 is axially supported to a rear end side of the output shaft 24. It is configured such that the power of the engine 5 is taken out of the engine output shaft 24 toward the transmission case 17 via the flywheel 25. Further, an oil pan 59 is arranged in a lower surface of the cylinder block 51, and an oil filter 60 is arranged in a right side surface of the cylinder block 51.

A fuel supply pump 327 for supplying fuel is attached to the above of the oil filter 60 (the below of the intake air manifold 53) in the right side surface of the cylinder block 51. The fuel within the fuel tank 11 is structured such as to be supplied to an injector (not shown) with electromagnetic opening and closing control type fuel injection valve which is arranged in each of cylinders of the engine 5, via the fuel supply pump 327, a cylindrical common rail 341, and a fuel filter 343.

The fuel in the fuel tank 11 is pressure fed to the common rail 341 from the fuel supply pump 327 via the fuel filter 343, and the high-pressure fuel is stored in the common rail 341. The high-pressure fuel within the common rail 341 is injected to each of the cylinders of the engine 5 by controlling to respectively open and close the injector (the fuel injection valve) arranged in each of the cylinders of the engine 5. More specifically, it is possible to control an injection pressure, an injection timing and an injection period (an injection amount) of the fuel with a high precision by electronically controlling the fuel injection valve in each of the injectors of the engine 5, and nitrogen oxides (NOx) discharged out of the diesel engine 1 is structured such as to be capable of being reduced.

Meanwhile, an EGR device 76 (an exhaust gas recirculation device) is arranged in the intake air manifold 53, and an air cleaner 145 is connected to the intake air manifold 53 via the EGR device 76. The EGR device 76 is positioned in a right lateral side of the cylinder head 52, and the air cleaner 145 is positioned in front of the engine 5. Fresh air (external air) sucked into the air cleaner 145 from the front surface side of the hood 6 is dust removed by the air cleaner 145, is thereafter fed to the EGR device 76 from the air cleaner 145 via an intake air relay pipe 146, is next fed to the intake air manifold 53 from the EGR device 76, and is supplied to each of the cylinders of the engine 5. Further, the EGR device 76 is structured such as to mix a part (EGR gas) of the exhaust gas from the exhaust manifold 54 with the fresh air from the air cleaner 145 so as to supply to the intake air manifold 53.

In the structure mentioned above, the fresh air is supplied to the intake air manifold 53 from the air cleaner 145 and the EGR gas is supplied to the intake air manifold 53 from the exhaust manifold 54 in the meantime, so that the fresh air from the air cleaner 145 and the EGR gas from the exhaust manifold 54 are mixed in an intake air loading side of the intake air manifold 53. In other words, the highest combustion temperature at the high-load operating time is lowered, and a discharge amount of NOx (nitrogen oxides) from the engine 5 is reduced, by recirculating a part of the exhaust gas discharged out of the engine 5 to the exhaust manifold 54 from the intake air manifold 53 to the engine 5.

Further, the exhaust gas purification device 50 is arranged above the exhaust manifold 54 in the upper surface side of the engine 5, that is, above the exhaust manifold 54 in a left lateral side of the cylinder head 52. The exhaust gas purification device 50 is provided for collecting particulate matters (PM) in the exhaust gas, and an outer shape of the exhaust gas purification device 50 is constructed into an approximately cylindrical shape extending long in a front-back direction which is parallel to the output shaft 24 of the engine 5. An exhaust gas inlet pipe 86 and an exhaust gas outlet pipe 93 are provided in both front and rear sides (an upstream side and a downstream side in an exhaust gas moving direction) of the exhaust gas purification device 50 so as to be sorted into front and rear of the engine 5. The exhaust gas inlet pipe 86 which is an exhaust gas intake side of the exhaust gas purification device 50 is detachably fastened by bolts to an exhaust gas outlet of the exhaust manifold 54.

A description will be given of a structure of the exhaust gas purification device 50. The exhaust gas purification device 50 is provided with a cylindrical purification housing 87. A diesel oxidation catalyst 88 and a soot filter 89 are arranged in an inner portion of the purification housing 87 in series in an exhaust gas moving direction, the diesel oxidation catalyst 88 generating nitrogen dioxide ($NO_2$) and being constructed by platinum, and the soot filter 89 continuously oxidizing and removing the collected particulate matters (PM) at a comparatively low temperature and having a honeycomb structure. A tail pipe 94 is coupled to an exhaust gas outlet pipe 93 of the purification housing 87 so as to discharge the exhaust gas from the exhaust gas outlet pipe 93 to outside via the tail pipe 94.

The purification housing 87 is detachably fastened by bolts to the cylinder head 52 via a bracket leg body 83 serving as a support body. Further, the purification housing 87 is communicated with and connected to the exhaust manifold 54 via the exhaust gas inlet pipe 86 by fastening an inlet flange body of the exhaust gas inlet pipe 86 to an outlet portion of the exhaust manifold 54. As a result, the purification housing 87 is stably coupled and supported to the exhaust manifold 54 and the cylinder head 52 which are high-rigidity parts of the engine 5, by the bracket leg body 83 and the exhaust gas inlet pipe 86.

In the structure mentioned above, the nitrogen dioxide ($NO_2$) generated by the oxidation action of the diesel oxidation catalyst 88 is taken into the soot filter 89. The particulate matters contained in the exhaust gas of the engine 5 is collected by the soot filter 89, and is continuously oxidized and removed by the nitrogen dioxide ($NO_2$). A contained amount of the carbon monoxide (CO) and the carbon hydride (HC) in the exhaust gas of the engine 5 can be reduced in addition to the removal of the particulate matters (PM) in the exhaust gas of the engine 5.

Next, a description will be given of a structure of an internal portion of an engine room 10 which is formed by the hood 6. A fan shroud 141 is provided in a rising manner in a front portion side of an engine frame 14 in the internal portion of the engine room 10, a back surface side of a radiator 109 is attached to the fan shroud 141, and the radiator 109 is provided in a rising manner in a front surface side of the engine 5. The fan shroud 141 surrounds an outer peripheral side of the cooling fan 56, and is structured such that the cooling fan 56 takes the outside air in front of the radiator 109 as a cooling air from the front side of the hood 6 into the internal portion of the engine room 10. The air cleaner 145 is arranged in a front surface side of the radiator 109, and a battery 202 for supplying an electric power is arranged in an upper surface of the front portion of the engine frame 14.

Further, a shielding plate 144 computing the engine room 10 side and an inner portion of the cabin 7 (a control space where the operator gets on board) side is provided in the front surface side of the cabin 7 in the inner portion of the engine room 10. The engine room 10 surrounding front and rear and right and left sides and the above of the engine 5 is formed by the hood 6, the fan shroud 141, and the shielding plate 144. A operation column 244, a steering column 245, a brake pedal (a brake operation device) 251 or a clutch pedal 253 is arranged in the rear surface side of the shielding plate 144, the operation column 244 having a display panel or an operation switch, and the steering column 245 having the control steering wheel 9.

As shown in FIGS. 6 to 9, an upper support frame 147 which is longer back and forth is bridged between an upper portion of a rear surface of the fan shroud 141 and an upper portion of a front surface of the shielding plate 144. The upper portions of the fan shroud 141 and the shielding plate 144 are coupled with a high rigidity by the upper support frame 147 while fastening by bolts a rear portion fixing bracket 149 in a rear end of the upper support frame 147 to the upper portion of the front surface of the shielding plate 144 as well as fastening by bolts a front portion fixing bracket 148 in a front end of the upper support frame 147 to the upper portion of the rear surface of the fan shroud 141.

Meanwhile, a hood stay 155 which is longer back and forth is provided in a facing position to the upper support frame 147 in the inner surface side of the hood 6. A hood opening and closing fulcrum shaft 156 is arranged in an upper portion of a front surface of the shielding plate 144 via a fulcrum bracket 150. A rear end of the hood stay 155 is rotatably coupled to the hood opening and closing fulcrum shaft 156. The hood stay 155 is attached to the shielding plate 144 via the hood opening and closing fulcrum shaft 156. A front end side of the hood stay 155 is structured such as to move up and down around the hood opening and closing fulcrum shaft 156, whereby the hood 6 opens and closes.

In addition, a gas spring 157 is loaded between the upper support frame 154 and the hood stay 155. An end portion in a rod side of the gas spring 157 is rotatably pivoted to a front portion side of the upper support frame 147 by right and left laterally facing pin shafts 158. An end portion in a cylinder side of the gas spring 157 is rotatably pivoted to a longitudinally midstream portion of the hood stay 155 by right and left laterally facing pin shafts 159. The front side of the hood 6 is rotated upward around the hood opening and closing fulcrum shaft 156 on the basis of an operation of unlocking a lock of a hood lock mechanism (not shown) and lifting upward the front portion of the hood 6, and the front side and the upper surface side of the engine 5 are opened. Further, the hood 6 is retained at an open position on the basis of a stretching action of the gas spring 157.

Next, a description will be given of a support structure of an engine controller 311 with reference to FIGS. 6 to 9. There are provided the engine controller 311 which controls to actuate each of the portions of the diesel engine 5, and a controller support body 160 for attaching the engine controller 311. A lower end side of a lower portion support body 161 is detachably fastened by bolts to an external side surface of the right side of engine frame 14 via a fastening bracket 161*a*, and a lower end side of a controller attaching plate body 164 is coupled to an upper end side of the lower portion support body 161 via a vibration isolation rubber body 165. Further, an upper portion support body 162 is detachably fastened by bolts to the upper support frame 147, and an upper end side of the controller attaching plate body 164 is coupled to a bridging stay portion 162a of the upper portion support body 162 via a vibration isolation rubber body 166.

In other words, the controller support body 160 is formed by the lower portion support body 161 having the fastening bracket 161a, the upper portion support body 162 having the bridging stay portion 162a, and the controller attaching plate body 164, the controller attaching plate body 164 is supported in an extending manner to the upper end side of the lower portion support body 161 which is provided in a rising manner approximately vertically, the bridging stay portion 162a is extended approximately horizontally to the lateral direction of the engine 5 in the meantime, and the bridging stay portion 162a is coupled in an L-shaped manner to the upper end side of the controller attaching plate body 164. Further, the engine controller 311 is attached to the controller support body 160 which is provided in a rising manner in the right side of the engine 5, and the engine controller 311 is arranged at a higher position in the intake air manifold 53 side in the engine 5. The engine controller 311 can be fixed to the engine frame 14 and the upper support frame 147 which have a high rigidity, it is possible to simply improve a support rigidity of the engine controller 311, and it is possible to easily improve an assembling workability of the engine controller 311.

The engine controller 311 is arranged in the inner portion of the engine room 10 in the external side of the engine frame 14 by the controller support body 160. As a result, the engine controller 311 is arranged in a cooling air path in which the cooling air introduced into the engine room 10 from the cooling fan 56 in front of the engine 5 is discharged out of the hood 6 to the external side. Therefore, the engine controller 311 can be arranged at a higher position in the right side of the engine 5 which is an exhaust heat space of the engine 5, and it is possible to prevent an abnormal operation such as a thermal runaway of the engine controller 311. Further, since the engine controller 311 is arranged in one side in the intake air manifold 53 side in the engine 5, the engine controller 311 can be arranged in the internal portion of the engine room 10 at a position which is away from a heat source such as the exhaust gas purification device 50 on the exhaust manifold 52. Further, the engine controller 311 arranged in the inner side of the hood 6 is not directly exposed to a muddy water or a rain water.

Further, there is provided a differential pressure sensor 325 with an electric wiring connector which measures a pressure difference of the exhaust gas between an upstream side and a downstream side of the soot filter 40 of the exhaust gas purification device 50. The differential pressure sensor 325 is arranged in the sensor bracket portion 162b of the upper portion support body 162. The sensor bracket portion 162 of the upper portion support body 162 which is attached along the upper support frame 147 is arranged in an upper side of the exhaust gas purification device 50. Further, the sensor bracket portion 162 can be arranged at a position which is away from the exhaust gas purification device 50, and it is possible to reduce an influence given to the electronic part (the differential pressure sensor 325) supported by the sensor bracket portion 162, due to the exhaust heat applied from the exhaust gas purification device 50. To the sensor bracket portion 162b of the upper portion support body 162, an electric wiring connector of a temperature sensor for detecting an exhaust gas temperature of the exhaust gas purification device 50 can be supported as well as the differential pressure sensor 325.

According to the above structure, the controller support body 160 is firmly fixed to the upper support frame 147 in its upper end side, and is firmly fixed to the engine frame 14 in its lower end side, and the engine controller 311 is fixed to the controller support body 160 via the vibration isolation rubber 165. Therefore, it is possible to reduce the influence given by the oscillation (the low-frequency oscillation) of the engine 5 as well as it is possible to enhance the support rigidity of the engine controller 311, so that it is possible to prevent the engine controller 311 from breaking down. Further, it is possible to shorten a harness length between the differential pressure sensor 325 and the engine controller 311 by employing a structure in which the differential pressure sensor 325 is attached at the higher position of the engine 5, and it is possible to improve the assembling workability of the engine controller 311.

As shown in FIGS. 5 to 9, in the working vehicle including the engine controller 311 which controls the engine 5 as well as having the diesel engine 5, the machine body frame 14 which couples the engine 5, and the hood 6 which covers the upper surface side of the engine 5, the controller support body 160 attached to the machine body frame 14 is provided, the controller support body 160 is provided in a rising manner in one side of the engine 5, the engine controller 311 is attached to the upper end side of the controller support body 160, and the engine controller 311 is arranged in one side of the engine 5. Therefore, the engine controller 311 can be placed in the machine body frame 14 having a high rigidity, it is possible to simply improve the support rigidity of the engine controller 311, and it is possible to easily improve the assembling workability of the engine controller 311. Further, it is possible to simplify a harness support structure between the engine 5 and the engine controller 311 since the engine controller 311 can be supported at the higher position in the lateral side of the engine 5. Further, since the engine controller 311 can be arranged at the higher position in the lateral side of the engine 5 which is the exhaust heat space of the engine 5 even in the case that the internal space of the engine room 10 is restricted, it is possible to prevent the abnormal operation such as the thermal runaway of the engine controller 311.

As shown in FIGS. 5 to 9, the controller support body 160 has the controller attaching plate body 164 to which the engine controller 311 is firmly attached, the upper portion support body 162 which couples the controller attaching plate body 164 to the upper support frame 147 in the internal portion of the hood 6, and the lower portion support body 161 which couples the controller attaching plate body 164 to the engine frame 14 (the machine body frame). Therefore, the engine controller 311 can be placed in the controller support body 160 via the vibration isolation body (the vibration isolation rubber bodies 165 and 166) in spite of the fact that the support rigidity of the engine controller 311 can be enhanced. It is possible to reduce the influence given by the oscillation of the engine 5, and it is possible to prevent the engine controller 311 from breaking down.

As shown in FIGS. 5 to 9, in the structure in which the upper end side of the controller support body 160 is coupled to the upper support frame 147 in the internal portion of the hood 6, and the exhaust gas purification device 50 purifying the exhaust gas of the engine 5 is provided, the engine controller 311 is arranged in one side of the engine 5 across the upper support frame 147, and the exhaust gas purification device 50 is arranged in the other side of the engine 5. Therefore, the engine controller 311 can be attached compactly along the vicinity of the engine 5 in spite of the fact that it is possible to reduce the restriction of the arranged position of the exhaust gas purification device 50 which is greater and heavier than the conventional exhaust muffler. Further, it is possible to improve the assembling workability or a maintenance workability of the exhaust gas purification device 50 or the engine controller 311.

As shown in FIGS. 5 to 9, in the structure having the exhaust gas purification device 50 which purifies the exhaust gas of the engine 5, and the sensor 325 which detects the exhaust gas of the exhaust gas purification device 50, the upper end side of the controller support body 160 is coupled to the upper support frame 147 in the internal portion of the hood 6 via the upper portion support body 162, and the sensor 325 is arranged in the upper portion support body 162. Therefore, it is possible to shorten the harness length between the sensor 325 and the engine controller 311 and it is possible to reduce deterioration of the harness connected to the sensor 325 by employing the structure in which the sensor 325 is attached to the higher position of the engine room 10 where the engine 5 is arranged. Further, it is possible to improve the assembling workability or the maintenance workability of the engine controller 311 (the harness).

A description will be given of the control seat 8 and a peripheral structure thereof with reference to FIGS. 1, 2, 10 and 11. The control steering wheel 9 is arranged in front of the control seat 8 within the cabin 7. The steering column 245 is provided in a rising manner so as to be buried in a back surface side of the operation column 244 which surrounds the rear portion side of the engine 5. The control steering wheel 9 of an approximately round type in a plan view is attached to an upper end of a handle shaft which is protruded out of an upper surface of the steering column 245. Therefore, the control steering wheel 9 is in an attitude which is inclined diagonally downward in a rearward direction in relation to a horizontal direction.

A throttle lever 250 and a pair of right and left brake pedals 251 are arranged in a right side of the steering column 245, the throttle lever 250 setting and retaining an output speed of the engine 5, and the brake pedals 251 provided for operating to brake the travel machine body 2. A forward and backward movement switching lever (a reverser lever) 252 and a clutch pedal 253 are arranged in a left side of the steering column 245, the forward and backward movement switching lever 252 provided for operating to switch a traveling direction of the travel machine body 2 to a forward travel and a backward travel, and the clutch pedal 253 provided for actuating to turn off a main clutch for connecting and disconnecting the power. A parking brake lever 254 is arranged in a back surface side of the steering column 245, the parking brake lever 254 provided for retaining the right and left brake pedals 251 at a depressing position.

An erroneous operation prevention body (a reverser guard) 261 is provided below the forward and backward movement switching lever 252 in a left side of the steering column 245 so as to protrude from the steering column 245, the erroneous operation prevention body 261 covering the forward and backward movement switching lever 252 from a lower side. Since the erroneous operation prevention body 261 serving as a contact prevention device is arranged below the forward and backward movement switching lever 252, it is possible to prevent the operator from being in contact with the forward and backward movement switching lever 252 when the operator gets on and off the working vehicle.

An accelerator pedal 255 is arranged in a right side of the steering column 245 in a floor panel 248 within the cabin 7, the accelerator pedal 255 being provided for accelerating or decelerating the engine speed in a range which is higher than a minimum rotation speed corresponding to an engine speed set by the throttle lever 250. A PTO transmission lever 256 and a differential lock pedal 257 are arranged below the control seat 8, the PTO transmission lever 256 being provided for operating to switch a drive speed of a PTO shaft, and the differential lock pedal 257 being provided for executing an operation of rotationally driving the right and left rear wheels 4 at a uniform speed. A sub transmission lever 258 is arranged in a left side of the control seat 8, the sub transmission lever 258 being provided for switching an output range of a travel sub transmission gear mechanism to a low speed and a high speed.

An armrest 259 for putting an arm or an elbow of the operator seating on the control seat 8 thereon is provided in a right side of the control seat 8. The armrest 259 is constructed as an independent body from the control seat 8, and is provided with a main transmission lever 290 which is a traveling system operation means, and a working portion position dial (an elevation dial) 300 which is a working system operation means. The main transmission lever 290 is provided so as to be operable to be tilted back and forth as a main transmission operation body. Further, in the present embodiment, a vehicle speed of the travel machine body 2 is increased in the case that the main transmission lever 290 is operated to be tilted forward, and the vehicle speed of the travel machine body 2 is reduced in the case that the main transmission lever 290 is operated to be tilted rearward. The working portion position dial 300 is a dial type structure for manually changing and regulating a height position of the rotary tiller 15.

As shown in FIGS. 1, 2, 10 and 11, the meter panel 246 is arranged in a state in which a panel surface is inclined somewhat upward from a rear side so as to face to the operator seating on the control seat 8 at a position which is a lower side in front of the control steering wheel 9. Further, an outer edge of the meter panel 246 is covered with a meter cover 262 which is upraised toward an outer side from an inner side. Further, the meter panel 246 covered with the meter cover 262 is arranged in a rear direction (a back surface) of a dash board 263 in an upper portion in front of the steering column 245. The dash board 263 constructs an operation column together with the steering column 245.

Figure 10:
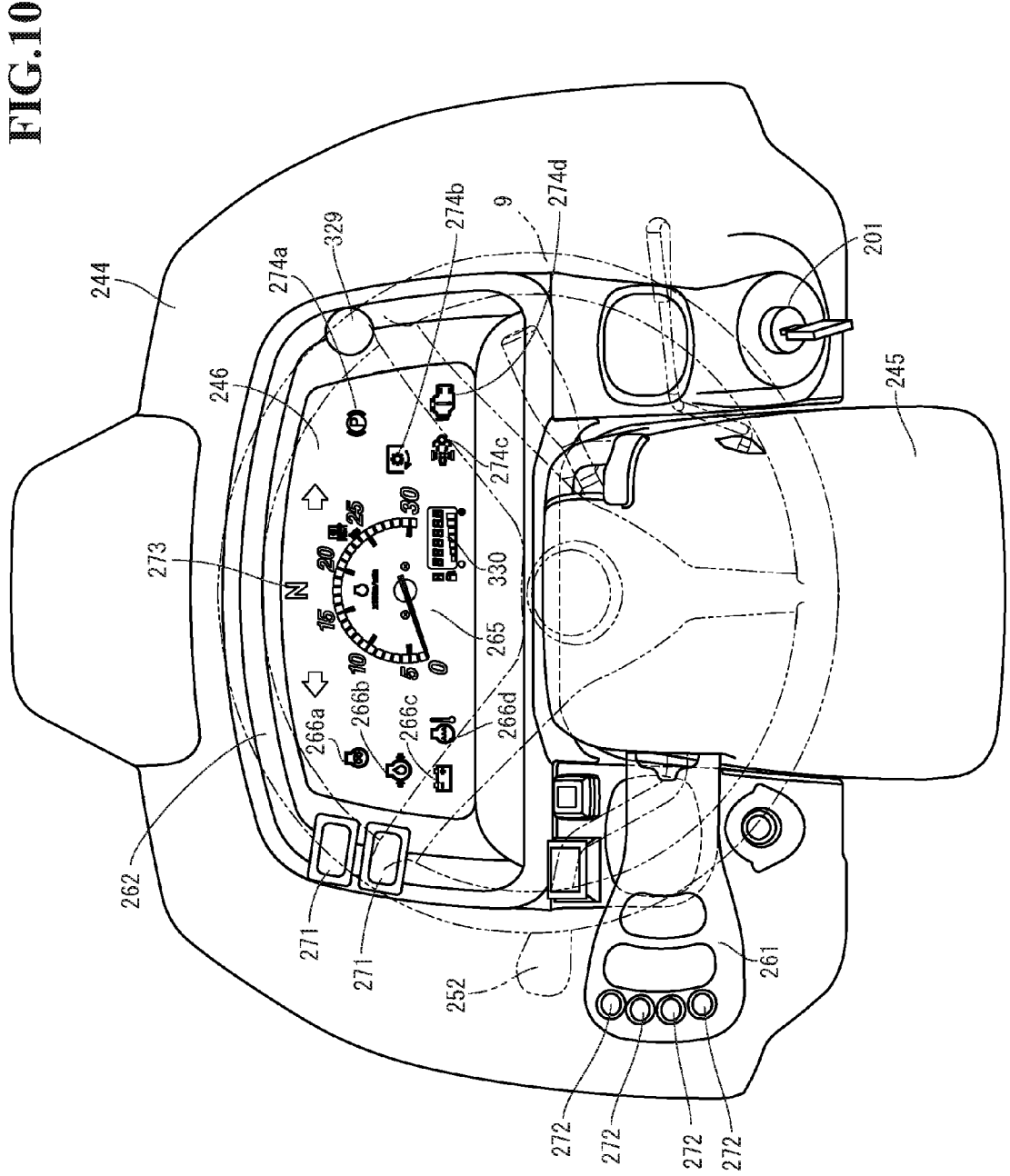
FIG. 10 is a front elevational view of a meter panel as seen from a control seat side.

The meter panel 246 has an engine rotation indicator 265 indicating a rotation number of the engine 5 by an indicating needle in its center display area, and has display lamps 266a to 266d and 267a to 267d constructed by LED in display areas in right and left outer sides (an outer side of the center display area) of the engine rotation indicator 265, as a driving operation display device, as shown in FIG. 10. In the meter panel 246 having the structure mentioned above, the display lamps 266a to 266d and 267a to 267d act as warning lamps indicating abnormal operation in each of the portions of the tractor 1, or display lamps indicating a traveling state of the tractor 1 or an actuation state of the rotary tiller 15.

In a structure example in FIG. 10, the display lamps 267a to 267d are respectively actuated in a right display area of the meter panel 246 as a parking brake lamp 346 (refer to FIG. 12) which informs of a lock state of the parking brake lever 254, a PTO lamp 348 (refer to FIG. 12) which informs of an on state of the PTO clutch switch 225, a regeneration lamp 332 (refer to FIG. 12) for informing of a regeneration control request alarm, and an engine abnormal operation lamp 347 (refer to FIG. 12) which informs of an abnormal operation of the engine 5. Further, the meter panel 246 has a liquid crystal panel 330 mentioned later in a lower side of the engine rotation indicator 265.

Further, the center display area of the meter panel 246 has a display lamp 273 constituted by LED in a display area in an upper side of the engine rotation indicator 265. The display lamp 273 acts as a reverser neutral lamp 349 (refer to FIG. 12) which informs of a neutral state of the forward and backward movement switching lever 252 by shaping "N" letter on the meter panel 246.

A switch 271 is placed on a left surface in a rear back surface of the meter cover 262, and a regeneration switch 329 is placed on a right surface in the meantime. Further, a switch 272 receiving an operation from the operator is arranged in an upper surface of the erroneous operation prevention body 261 which is protruded out of the left side surface of the steering column 245. One of the switches 271 and 272 is allocated to a control mode selection switch 350 which designates any of a droop control and an isochronous control as a control mode of the engine 5.

The regeneration switch 329 is placed in a right surface of a backward rear surface of the meter cover 262. The regeneration switch 329 is of a momentary operation type. In other words, the regeneration switch 329 is a non-lock type push switch which issues one ON pulse signal by one depression. A depressing time of the regeneration switch 329 by the operator is employed as one of standards for discriminating whether or not each of regeneration controls after the reset regeneration control can be executed. The regeneration switch 329 according to the embodiment is constructed by a switch with lamp which has a regeneration switch lamp 345 built-in. Since the regeneration switch 329 is arranged in the vicinity of the meter panel 246 which displays a regeneration request alarm mentioned later by the display lamp 267a, the operator can carry out an operation of the regeneration switch 329 in a state in which the operator views the display of the meter panel 246.

Figure 12:
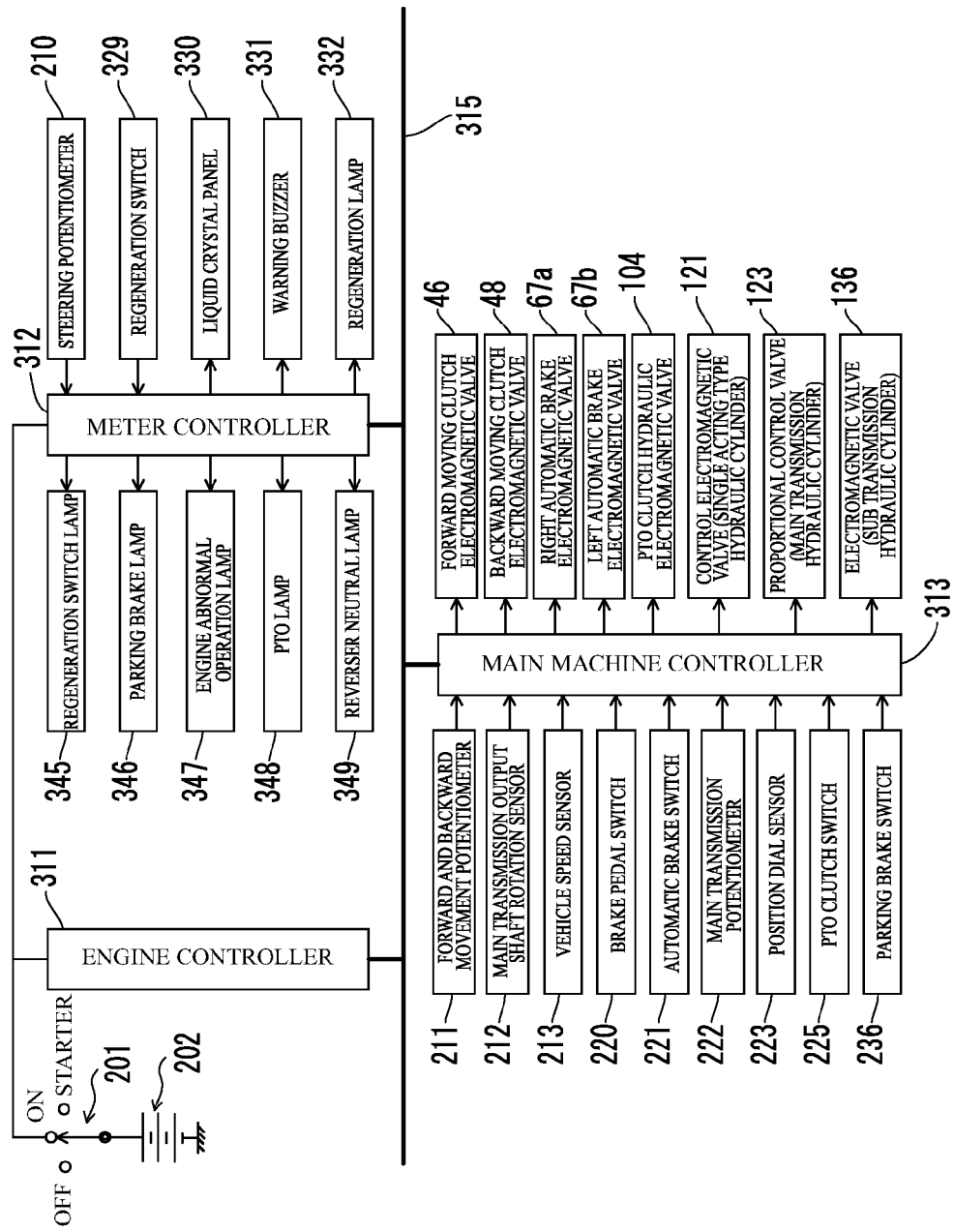
FIG. 12 is a function block diagram of a controller.

Further, in the embodiment, the regeneration switch 329 is arranged in the vicinity of the display lamp 267a of the meter panel 246 which serves as the regeneration lamp 332 (refer to FIG. 12). In other words, the regeneration switch 329 is arranged in the vicinity of a display area of the regeneration control request alarm in the meter panel 246 which comes to a driving operation display portion. Therefore, the operator can easily recognize the operation position of the regeneration switch 329 when the regeneration request alarm is informed by the display of the display lamp 267a.

Figure 11:
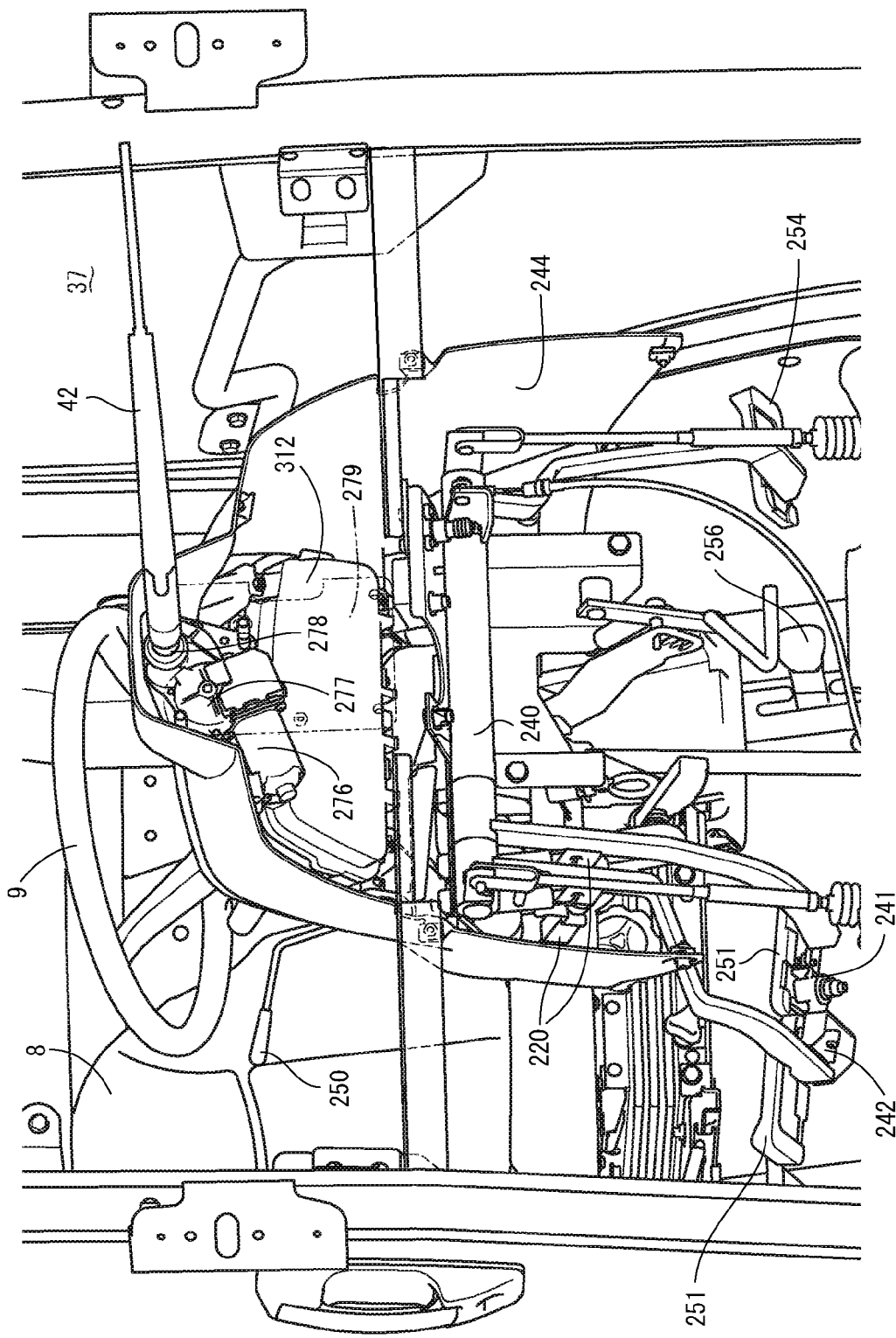
FIG. 11 is a partly enlarged view of a cabin as seen from a right side in a forward direction.

The operation column 244 covers a rear side of a windshield with a forward part of its upper surface, and internally embeds a wiper drive mechanism, as shown in FIG. 11. The wiper drive mechanism is constructed by a drive motor 276 which generates rotative power to a wiper 42, and a gear box 277 which has a gear mechanism transmitting the rotative power of the drive motor 276 to the wiper 42. The rotation of the drive motor 276 is transmitted to a wiper rotating shaft 278 of the wiper 42 via the gear box 277 according to rotation of the drive motor 276, and the wiper 42 rotationally moves along a surface of the windshield. The wiper drive mechanism constructed by the drive motor 276 and the gear box 277 is covered its rear side with a wiper drive mechanism cover 275, and is covered its front side with a wiper drive mechanism support stay 279.

The operation column 244 is structured, as shown in FIG. 10, such that the meter panel 246 is fitted and fixed to an inner side of the meter cover 262 in a rear surface of the operation column 244. The operation column 244 is structured, as shown in FIG. 11, such that a meter controller 312 is coupled to a front surface of the meter panel 246 fitted to the inner side of the operation column 244 and the meter controller 312 is arranged in a lower side of the wiper drive mechanism (the drive motor 276 and the gear box 277). The meter controller 312 within the operation column 244 is electrically connected to the drive motor 276.

The right and left brake pedals 251 and 251, and the clutch pedal 253 are pivoted their respective base end sides to a support rod 240 which is fixed and arranged within the operation column 244. Right and left brake pedal switches 220 and 220 are fixed and arranged at positions which can come into contact with arm portions of the right and left brake pedals 251 and 251 within the operation column 244. One end of a coupling member 241 is pivoted to a rear surface of one of the right and left brake pedals 251 and 251, and a locking member 242 locking to the other end of the coupling member 241 is provided in a rear surface of the other brake pedal 251. The right and left brake pedals 251 and 251 can be coupled by locking the other end of the coupling member 241 to the locking member 242, so that the right and left brake pedals 251 and 251 can be simultaneously operated. The right and left brake pedals 251 and 251 can be independently operated by detaching the other end of the coupling member 241 from the locking member 242.

Next, a description will be given of a structure for executing various controls (a transmission control, an automatic horizontal control and a tilling depth automatic control) of the tractor 1 with reference to FIG. 12. As shown in FIG. 12, the tractor 1 is provided with the engine controller 311 which controls the driving of the engine 5, the meter controller (the driving operation display controller) 312 which controls a display operation of the meter panel 246 mounted to the operation column 244, and a main machine controller 313 which controls a speed of the travel machine body 2.

The controllers 311 to 313 are respectively provided with ROM for storing control programs and data, RAM for temporarily storing the control programs and the data, timers for measuring time, and input and output interfaces in addition to CPU which executes various computing processes and controls, and are connected so as to be communicated with each other via a CAN communication bus 315. The engine controller 311 and the meter controller 312 are connected to the battery 202 via a key switch 201 for applying a power source. The key switch 201 is a rotary type switch which can be turned by a predetermined key inserted into a key hole, and is attached to a right position of the steering column 245 of the operation column 244 as shown in FIG. 10.

To an input side of the meter controller 312, there are connected a steering potentiometer 210 which detects an amount of rotation (a steering angle) of the control steering wheel 9, and a regeneration switch 329 which serves as an input member allowing regeneration operation of the exhaust gas purification device 50. Further, to an output side of the meter controller 312, there are connected a liquid crystal panel 330 in the meter panel 246, a warning buzzer 331 which sounds in conjunction with the reproducing operation of the exhaust gas purification device 50, the regeneration lamp 332 which serves as an alarm lamp blinking in conjunction with the reproducing operation of the exhaust gas purification device 50, the regeneration switch lamp 345 which is built in the regeneration switch 329 and blinks in response to the reproducing operation of the exhaust gas purification device 50, the parking brake lamp 346 which lights in the case that the parking brake lever 254 is in a lock state, the engine abnormal operation lamp 347 which lights in the case that any abnormal state exists in the engine 5, the PTO lamp 348 which lights in the case that the PTO clutch switch 225 is in an on state, and the reverser neutral lamp 349 which lights in the case that the forward and backward movement switching lever 252 is in a neutral state.

To an input side of the main machine controller 313, there are connected a forward and backward movement potentiometer 211 which detects an operation position of the forward and backward movement switching lever 252, a main transmission output shaft rotation sensor 212 which detects an output rotation number of the main transmission output shaft 36, a vehicle speed sensor 213 which detects a rotation speed (a traveling speed) of the front and rear wheels 3 and 4, a brake pedal switch 220 which detects with or without depression of the brake pedal 251, an automatic brake switch 221 which operates to switch automatic brake electromagnetic valves 67a and 67b, a main transmission potentiometer 222 which detects an operation position of the main transmission lever 290, a position dial sensor 223 which detects an operation position of the working portion position dial 300 manually changing and regulating a height position of the rotary tiller 15, a parking brake switch 236 which turns on in a state in which the depression positions of the right and left brake pedals 251 are kept by the parking brake lever 254 (a lock state by the parking brake lever 254), and a PTO clutch switch 225 which turns on in a power connection state of the PTO clutch (not shown).

To an output side of the main machine controller 313, there are connected a forward moving clutch electromagnetic valve 46 which actuates a forward moving clutch cylinder (not shown), a backward moving clutch electromagnetic valve 48 which actuates a backward moving clutch cylinder (not shown), a PTO clutch hydraulic electromagnetic valve 104 which actuates the PTO clutch (not shown), a control electromagnetic valve 121 for supplying a working fluid to a single acting type hydraulic cylinder (not shown) of the hydraulic elevating mechanism 20, a proportional control valve 123 which actuates a main transmission hydraulic cylinder (not shown) in proportion to an amount of tilting operation of the main transmission lever 290, a high speed clutch electromagnetic valve 136 which actuates a sub transmission hydraulic cylinder (not shown), and the automatic brake electromagnetic valves 67a and 67b which respectively actuate the right and left brake actuating mechanisms 65a and 65b.

Figure 13:
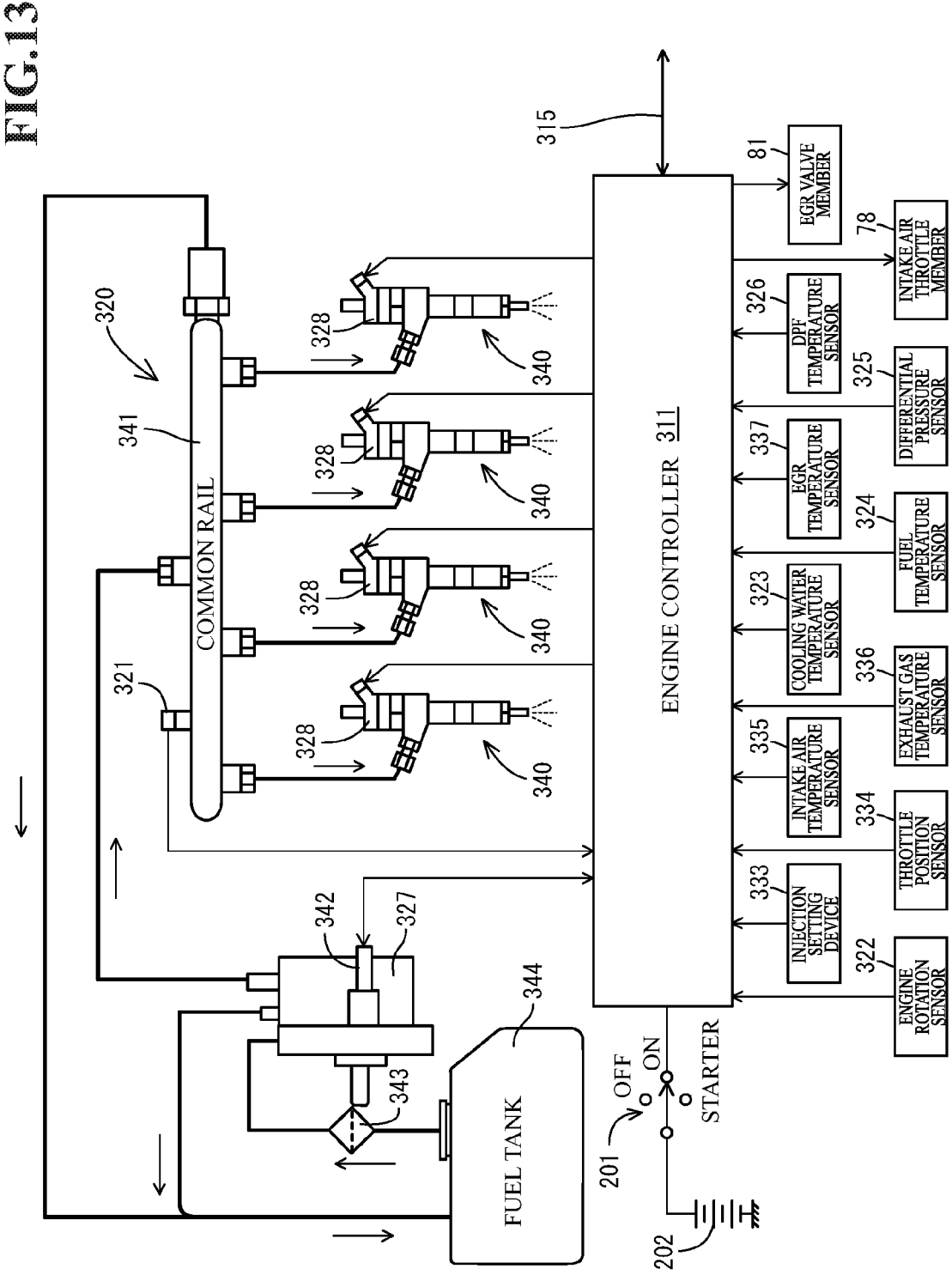
FIG. 13 is an explanatory view of a fuel system of the engine.

Further, as shown in FIG. 13, to an input side of the engine controller 311, there are connected at least a rail pressure sensor 321 which detects a fuel pressure within the common rail 341, an electromagnetic clutch 342 which rotates or stops the fuel supply pump 327, an engine rotation sensor 322 which detects a rotation speed of the engine 5 (a cam shaft position of the engine output shaft 24), an injection setting device 333 which detects and sets a fuel injection frequency (the number of times during a fuel injection period in one stroke) of the injector 340, a throttle position sensor 334 which detects an operation position of the accelerator operation device, an intake air temperature sensor 335 which detects an intake air temperature in the intake air channel, an exhaust gas temperature sensor 336 which detects an exhaust gas temperature in an exhaust channel, a cooling water temperature sensor 323 which detects a cooling water temperature of the engine 5, a fuel temperature sensor 324 which detects a fuel temperature within the common rail 341, an EGR temperature sensor 337 which detects a temperature of the EGR gas, a differential pressure sensor 325 which detects a differential pressure of the exhaust gas in the vicinity of (upstream and downstream) the soot filter 89 within the exhaust filter 50, and a DPF temperature sensor 326 which detects the exhaust gas temperature within the exhaust filter 50.

Electromagnetic solenoids of the respective fuel injection valves 328 are respectively connected to an output side of the engine controller 311, at least. In other words, the high-pressure fuel stored in the common rail 341 is injected from the fuel injection valve 328 separately at plural times during one stroke, while controlling the fuel injection pressure, the injection timing and the injection period, thereby suppressing generation of nitrogen oxides (NOx), executing complete combustion where generation of soot and carbon dioxide (CO2) is reduced, and improving a fuel consumption. Further, to an output side of the engine controller 311, there are connected an intake air throttle member 78 which adjusts an intake air pressure (an intake air amount) of the engine 5, and an EGR valve member 81 which adjusts a supply amount of the EGR gas to the intake air manifold 53.

The engine controller 311 basically determines a torque of the engine 5 from the rotation speed which is detected by the engine rotation sensor 322 and the throttle position which is detected by the throttle position sensor 334, computes a target fuel injection amount by using the torque and the output characteristic, and executes a fuel injection control for actuating the common rail 341 on the basis of the results of computation. The fuel injection amount of the common rail 341 is adjusted mainly by adjusting a valve opening period of each of the fuel injection valves 328 and changing an injection period into each of the injectors 340.

Figure 14:
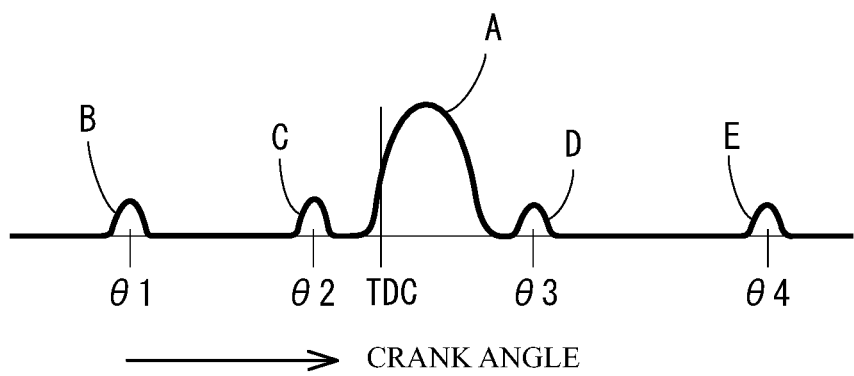
FIG. 14 is a view describing an injection timing of fuel.

As shown in FIG. 14, a common rail apparatus 320 having the common rail 341 connected to the injector 340 is structured such as to execute a main injection A in the vicinity of a top dead center (TDC). Further, the common rail apparatus 320 is structured such as to execute a small amount of pilot injection B for the purpose of reducing NOx and noise at a timing of a crank angle $\theta 1$ about 60 degrees before the top dead center, execute a pre-injection C for the purpose of reducing the noise at a timing of a crank angle $\theta 2$ just before the top dead center, and execute an after injection D and a post injection E for the purpose of reducing the particulate matters (hereinafter, refer to PM) and promoting the purification of the exhaust gas at timings of crank angles $\theta 3$ and $\theta 4$ after the top dead center, in addition to the main injection A.

The pilot injection B is provided for promoting the mixing of the fuel and the air by injecting at an ignition timing which is greatly advanced in relation to the main injection A. The pre-injection C is provided for shortening a delay of an ignition timing at the main injection A by injecting prior to the main injection A. The after injection D is provided for activating the diffusion combustion and raising the temperature of the exhaust gas from the engine 5 (reheating the PM) by injecting somewhat in retard of the main injection A. The post injection E is provided for supplying to the exhaust gas purification device 50 the fuel as an unburned fuel which does not contribute to the actual combustion process by injecting at a timing which is greatly delayed in relation to the main injection A. The unburned fuel supplied to the exhaust gas purification device 50 reacts on a diesel oxidation catalyst 243, and the temperature of the exhaust gas within the exhaust gas purification device 50 rises by a reaction heat. Here, ups and downs of a graph in FIG. 14 expresses difference in the fuel injection amount in each of the injection stages A to E.

Figure 15:
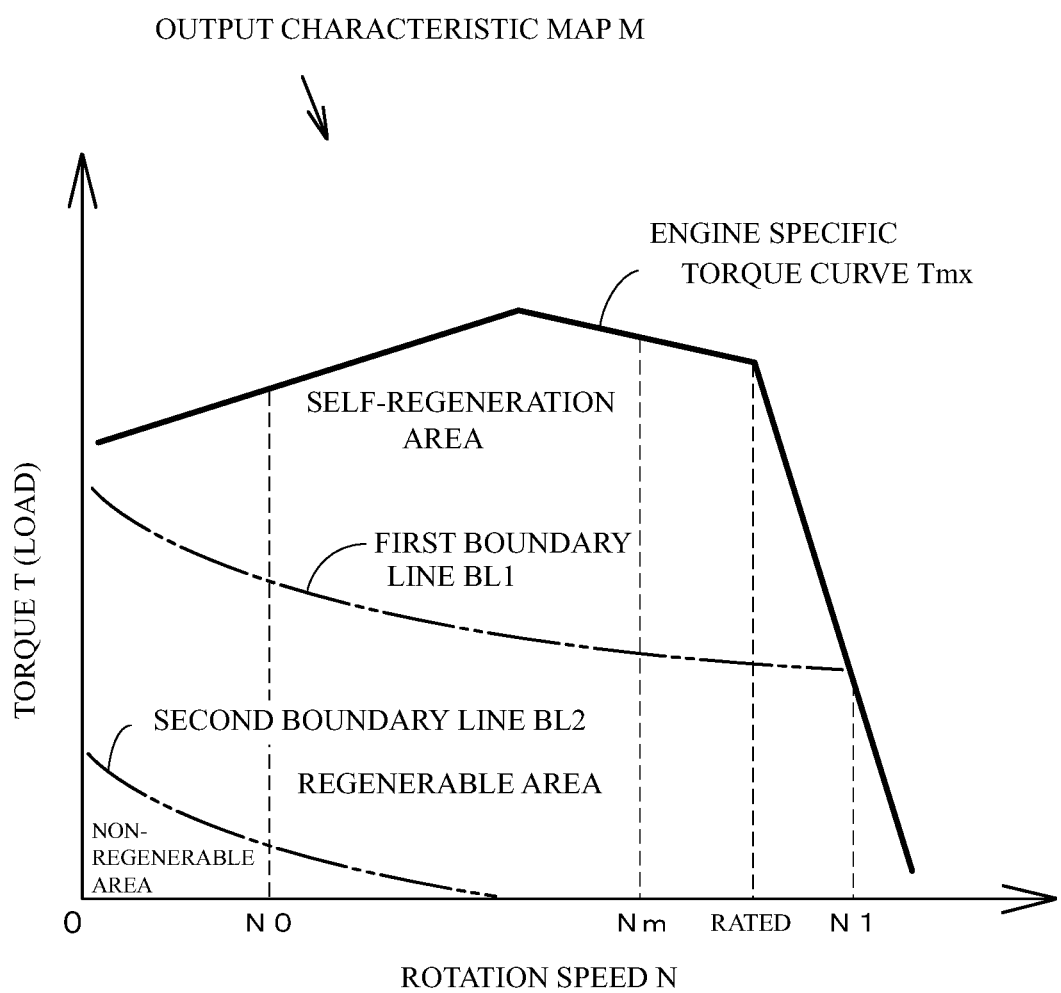
FIG. 15 is an explanatory view of an output characteristic map.

An output characteristic map M (refer to FIG. 15) is previously stored in EEPROM of the ECU 311, the output characteristic map M indicating a relationship between a rotation speed N and a torque T (load) of the engine 5. Further, although details thereof will be omitted, in the EEPROM of the ECU 311, there are previously stored an exhaust gas flow rate map which converts an exhaust gas flow rate on the basis of a relationship between the rotation speed N of the engine 5 and the fuel injection amount, and a PM discharge amount map which converts a PM discharge amount of the engine 5 on the basis of the relationship between the rotation speed N of the engine 5 and the fuel injection amount in the same manner. Each of the maps such as the output characteristic map M is determined by experiments. In the output characteristic map M shown in FIG. 15, the rotation speed N is set to a horizontal axis, and the torque T is set to a vertical axis. The output characteristic map M is an area which is surrounded by a solid line Tmx drawn convex upward. The solid line Tmx is a maximum torque line which indicates a maximum torque in relation to each of the rotation speed N. In this case, all the output characteristic maps M stored in the ECU 311 are the same (common) as long as the types of the engine 5 are the same. As shown in FIG. 15, the output characteristic map M is segmentized into vertically three sections by boundary lines BL1 and BL2 which express the relationship between the rotation speed N and the torque T at a predetermined exhaust gas temperature.

An area above the first boundary line BL1 is a self-regeneration area where the PM piled up in the soot filter 89 can be oxidized and removed only by a normal operation of the engine 5 (an oxidation action of the diesel oxidation catalyst 88 works). An area between the first boundary line BL1 and the second boundary line BL2 is a regenerable area where the PM is piled up in the soot filter 89 without being oxidized and removed only by the normal operation of the engine 5, however, the exhaust gas purification device 50 is regenerated by the execution of an assist regeneration control and a rest regeneration control mentioned later. An area below the second boundary line BL2 is a non-regenerable area where the exhaust gas purification device 50 is not regenerated even by executing the assist regeneration control and the reset regeneration control. Since the temperature of the exhaust gas of the engine 5 is too low in the non-regenerable area, the exhaust gas temperature does not rise up to a regeneration boundary temperature even by executing the assist regeneration control and the reset regeneration control from this state. In other words, the exhaust gas purification device 50 is not regenerated (the particulate matters collecting capacity of the soot filter 89 is not recovered) by the assist regeneration control and the reset regeneration control as long as the relationship between the rotation speed N of the engine 5 and the torque T is in the non-regenerable area. The exhaust gas temperature on the first boundary line BL1 is a self-regenerable regeneration boundary temperature (about 300° C.).

Figure 16:
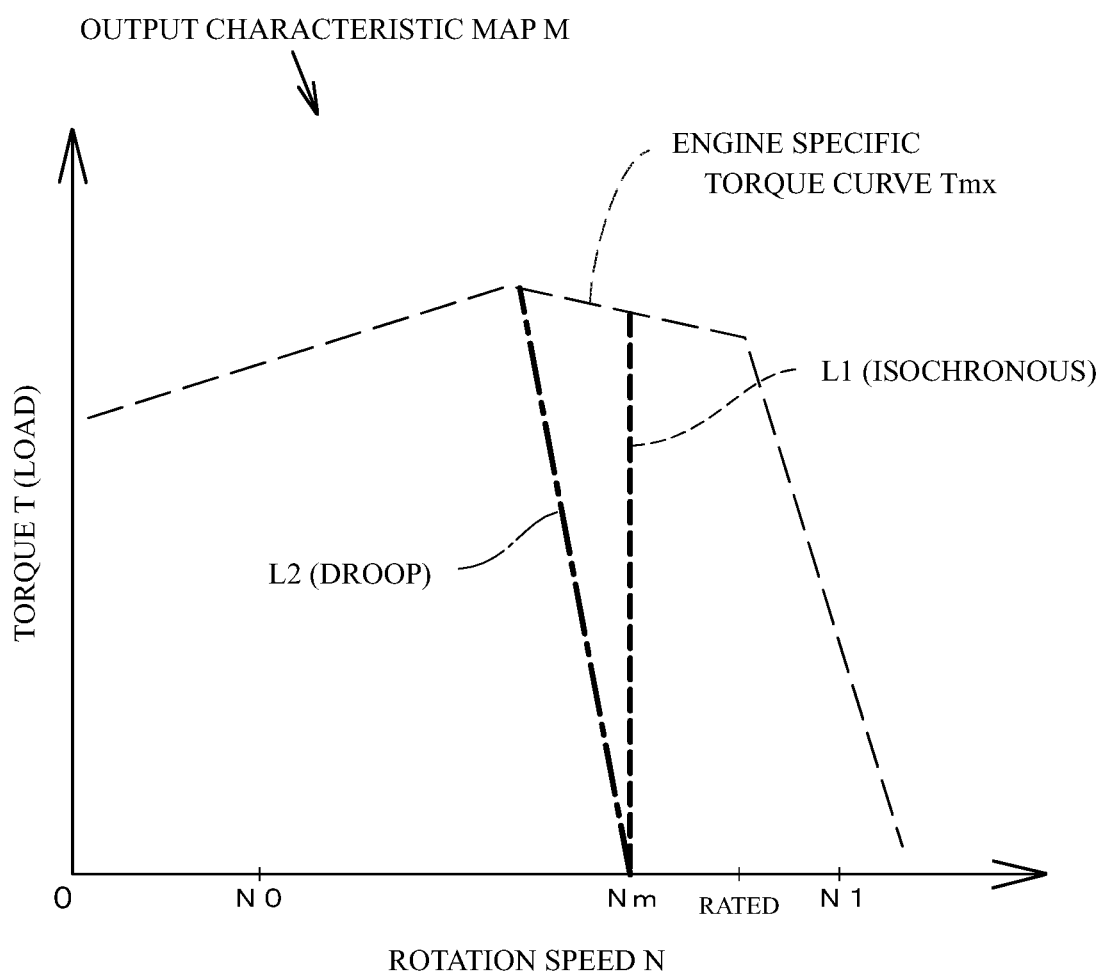
FIG. 16 is an explanatory view showing a relationship between an isochronous characteristic and a droop characteristic.

The engine controller 311 is structured, as shown in FIG. 16, such that the engine controller 311 can execute the droop control which adjusts the fuel injection amount so that the rotation speed N is reduced according to the increase of the load (the torque T) of the engine 5, and the isochronous control which adjusts the fuel injection amount so as to maintain the rotation speed N constant regardless of the fluctuation of the load of the engine 5, in the relationship between the rotation speed N and the torque T. When the control mode selection switch 271 is operated by the operator, the control mode is alternatively switched to any of the droop control and the isochronous control. In other words, the engine controller 311 recognizes, through the meter controller 312 and the CAN communication bus 315, which of the droop control and the isochronous control the control mode designated by the control mode selection switch 271 is.

The droop control is executed, for example, at a road traveling time. The droop characteristic (the relationship between the rotation speed N and the torque T at the droop control time) is a characteristic which is expressed by a straight line (a single-dot chain line L1 in FIG. 16) having a fixed slope which is inclined downward to the right in the output characteristic map M. In the case that the droop control is selected, the engine controller 311 calculates a target fuel injection amount on the basis of an operation amount of the accelerator pedal 255, and executes the fuel injection control of the common rail apparatus 320.

The isochronous control is executed at a time of various works, for example, a plowing work and a tilling work. The isochronous characteristic (the relationship between the rotation speed N and the torque T at the isochronous control time) is a characteristic (a broken line L2 in FIG. 16) which is expressed by a vertical line having a zero slope in the output characteristic map M. In the case that the isochronous control is selected, the engine controller 311 calculates the target fuel injection amount on the basis of a difference between the rotation speed N detected by the engine rotation sensor 322 and a target rotation speed Nt in such a manner as to be maintained at the target rotation speed Nt designated by the main transmission lever 290, and executes the fuel injection control of the common rail apparatus 320.

Figure 17:
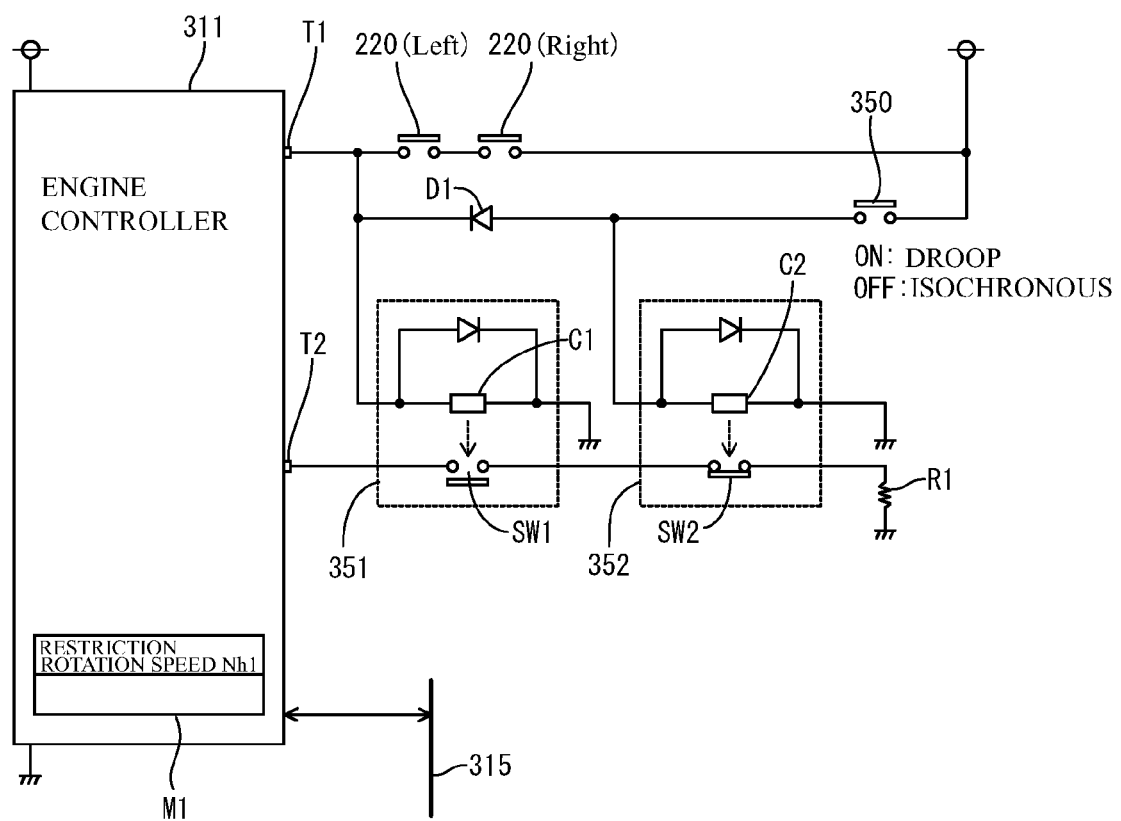
FIG. 17 is a first embodiment of a circuit block diagram showing a structure of an engine controller.

FIG. 17 shows a first embodiment of a circuit block diagram. The engine controller 311 is provided with a droop switching terminal (a control mode switching terminal) T1 and a high-idle restriction terminal T2 as shown in FIG. 17, and stores a high-idle restriction rotation speed Nh1 in a memory M1. The droop switching terminal T1 is connected to a cathode of a diode D1 for preventing backflow, and a power supply voltage is applied to an anode of the diode D1 via the control mode selection switch 350. The right and left brake pedal switches 220 and 220 are connected in series. Further, a series circuit constituted by the brake pedal switch 220 and 220 is connected in parallel to a series circuit constituted by the diode D1 and the control mode selection switch 350.

One end of an electromagnetic coil C1 of an electromagnetic switch 351 is connected to a connection node between the droop switching terminal T1 and the cathode of the diode D1, and one end of an electromagnetic coil C2 of an electromagnetic switch 352 is connected to a connection node between the anode of the diode D1 and the control mode selection switch 350. The other ends of the respective electromagnetic coils C1 and C2 of the electromagnetic switches 351 and 352 are grounded. Respective switches SW1 and SW2 of the electromagnetic switches 351 and 352 are connected in series. Further, one end of the switch SW1 is connected to the high-idle restriction terminal T2, and the other end of the switch SW2 which is connected its one end to the other end of the switch SW1 is grounded via a resistance R1.

The electromagnetic switch 351 turns on the switch SW1 in the case that the electric current flows through the electromagnetic coil C1 so as to generate an electromagnetic force, and turns off the switch SW1 in the case that the electric current does not flow through the electromagnetic coil C1 and the electromagnetic force is not generated. The electromagnetic switch 352 turns off the switch SW2 in the case that the electric current flows through the electromagnetic coil C2 so as to generate the electromagnetic force, and turns on the switch SW2 in the case that the electric current does not flow through the electromagnetic coil C2 and the electromagnetic force is not generated.

The engine controller 311 controls to drive the engine 5 according to the droop control method in the case that a signal input to the droop switching terminal T1 is high (power source potential). Meanwhile, the engine controller 311 controls to drive the engine 5 according to the isochronous control method in the case that the signal input to the droop switching terminal T1 is low (earth potential). The engine controller 311 restricts the rotation speed of the engine 5 by the high-idle restriction rotation speed Nh1 which is stored in the memory M1 (the high-idle restriction is validated), in the case that a signal input to the high-idle restriction terminal T2 is low (earth potential). Meanwhile, the engine controller 311 restricts by the rotation speed obtained by adding the predetermined rotation speed to the rated rotation speed (the high-idle restriction is invalidated), in the case that the signal input to the high-idle restriction terminal T2 is in a high impedance (open) state.

When the control mode selection switch 350 is turned on, the high signal is input to the droop switching terminal T1 of the engine controller 311. Since the signal input to the droop switching terminal T1 is high, the engine controller 311 recognizes that the droop control method is designated. At this time, the power supply voltage is applied to the electromagnetic coil C2 of the electromagnetic switch 352 via the control mode selection switch 350 at the same time that the power supply voltage is applied to the electromagnetic coil C1 of the electromagnetic switch 351 via the control mode selection switch 350 and the diode D1. Therefore, since the switch SW2 of the electromagnetic switch 352 is turned off as well as the switch SW1 of the electromagnetic switch 351 is turned on, the high-idle restriction terminal T2 comes to the high impedance (open) state, and invalidates the high-idle restriction.

When the control mode selection switch 350 is turned off, one of the right and left brake pedal switches 220 and 220 is turned off in the case that any one of the right and left brake pedals 251 and 251 is in a non-operation state. As a result, the low signal is input to the droop switching terminal T1 of the engine controller 311. Since the signal input to the droop switching terminal T1 is low, the engine controller 311 recognizes that the isochronous control method is designated. At this time, there comes a state in which the power supply voltage is not applied to the respective electromagnetic coils C1 and C2 of the electromagnetic switches 351 and 352. Therefore, since the switch SW2 of the electromagnetic switch 352 is turned on as well as the switch SW1 of the electromagnetic switch 351 is turned off, the signal applied to the high-idle restriction terminal T2 comes to a high impedance (open) state, and invalidates the high-idle restriction.

When the control mode selection switch 350 is turned off, both of the right and left brake pedal switches 220 and 220 are turned on in the case that both of the right and left brake pedals 251 and 251 are operated. As a result, the high signal is input to the droop switching terminal T1 of the engine controller 311. The engine controller 311 recognizes that the droop control method is designated since the signal input to the droop switching terminal T1 is high. At this time, the power supply voltage is applied only to the electromagnetic coil C1 of the electromagnetic switch 351. Therefore, since the respective switches SW2 and SW3 of the electromagnetic switches 352 and 352 are both turned on as well as the switch SW1 of the electromagnetic switch 351 is turned off, the signal applied to the high-idle restriction terminal T2 is low, and the high-idle restriction is validated. A coupling confirmation sensor may be provided for informing of the fact that the coupling member 241 is coupled to the locking member 242, thereby allowing the right and left brake pedal switches 220 and 220 to be simultaneously turned on in the case of making the engine controller 311 recognize the fact that the coupling member 241 is coupled to the locking member 242.

The engine controller 311 controls engine 5 while selecting any of the isochronous control and the droop control, and is provided with the control mode selection switch 350 which can alternatively select the isochronous control and the droop control. In the case that the isochronous control is designated by the control mode selection switch 350, the engine controller 311 controls the engine 5 according to the isochronous control when one of the right and left brake operation devices 251 and 251 is in the non-operation state, and controls the engine 5 according to the droop control when both of the right and left brake operation devices 251 and 251 are in the operation state. In the loader work, it is possible to switch the control mode of the engine by detecting whether or not it is in the traveling state on the basis of with or without the brake operation. Further, the engine can be driven at the fixed rotation speed according to the isochronous control at the traveling time and the engine can be driven in correspondence to the load according to the droop control at the working time.

The engine controller 311 stores the predetermined rotation speed Nh1 in addition to the high idling rotation speed based on the rated rotation speed of the engine 5. In the case that the isochronous control is designated by the control mode selection switch 350 and both of the right and left brake operation devices 251 and 251 are in the operation state, the engine controller 311 sets the predetermined rotation speed Nh1 to the high idling rotation speed. Even in the case that the droop control is executed by the brake operation when the isochronous control is designated, it is possible to prevent the engine stall and improve the fuel consumption by setting the high idling rotation speed to the rotation speed according to the isochronous control.

As the control mode (the regeneration control mode) of the engine 5, there are a normal operation control (a self-regeneration control) that the exhaust gas purification device 50 voluntarily regenerates only by a normal operation of the engine 5, an assist regeneration control of automatically raising the temperature of the exhaust gas by utilizing a load increase of the engine 5 if a clogged state of the exhaust gas purification device 50 comes to a specified level or more, a reset regeneration control of raising the temperature of the exhaust gas by using the post injection, a reset regeneration control of raising the temperature of the exhaust gas by using the post injection E, and a non-work regeneration control (which may be also called as a parking regeneration control or an emergency regeneration control) of raising the temperature of the exhaust gas by combining the post injection E and the predetermined high-speed rotation speed N1.

The normal operation control is a control type at the road traveling time or the farm working time. In the normal operation control, the relationship between the rotation speed N and the torque T in the engine 5 is in the self-regeneration area of the output characteristic map, and the exhaust gas of the engine 5 comes to a high temperature in such a degree that the PM oxidation amount within the exhaust gas purification device 50 goes beyond the PM collecting amount.

In the assist regeneration control, the exhaust filter 50 is regenerated by the adjustment of the opening degree of the intake air throttle member 78 and the after injection. In other words, in the assist regeneration control, the intake air amount to the engine 5 is restricted by closing the EGR valve member 81 and closing (throttling) the intake air throttle member 78 to a predetermined opening degree. Then, since the load of the engine 5 is increased, the fuel injection amount of the common rail 341 is increased for maintaining a set rotation speed, thereby raising the temperature of the exhaust gas of the engine 5. In conformity thereto, the diffusion combustion is activated by the after injection D which injects somewhat in retard of the main injection A, and the temperature of the exhaust gas of the engine 5 is raised. As a result, the PM within the exhaust gas purification device 50 is burned and removed. The EGR valve member 81 is closed in any of the regeneration controls described below.

The reset regeneration control is carried out in the case that the assist regeneration control fails (the clogged state of the exhaust gas purification device 50 is not improved and the PM stays behind) or the case that an accumulated driving time TI comes to a set time TI1 (for example, about 100 hours) or more. In the reset regeneration control, the exhaust gas purification device 50 is regenerated by executing the post injection E in addition to the aspect of the assist regeneration control. In other words, in the reset regeneration control, the temperature of the exhaust gas within the exhaust gas purification device 50 is raised (at about 560° C.) by directly supplying the unburned fuel into the exhaust gas purification device 50 in the post injection E and burning the unburned fuel by the diesel oxidation catalyst 88, in addition to the regulation of the opening degree of the intake air throttle member 78 and the after injection. As a result, the PM within the exhaust gas purification device 50 is burned and removed.

The non-work regeneration control is carried out in the case that the reset regeneration control fails (the case that the clogged state of the exhaust gas purification device 50 is not improved and the PM stays behind). In the non-work regeneration control, the temperature of the exhaust gas is raised by the post injection E even within the exhaust filter 50 (about 600° C.) in a state in which the temperature of the exhaust gas of the engine 5 is raised, by maintaining the rotation speed N of the engine 5 to the predetermined high rotation speed N1, in addition to the aspect of the reset regeneration control. As a result, the PM within the exhaust gas purification device 50 is forcibly burned and removed under a condition which is further better than that of the reset regeneration control. The intake air throttle member 78 in the non-work regeneration control is not throttled, but is completely closed. The after injection D in the non-work regeneration control is carried out in retard of the assist regeneration control and the reset regeneration control.

In the non-work regeneration control, the output of the engine 5 is restricted to a parking time maximum output (for example, about 80% of the maximum output) which is lower than the maximum output. In this case, since the rotation speed N of the engine 5 is maintained at the predetermined high rotation speed N1, the fuel injection amount of the common rail 341 is regulated so that the parking time maximum output is obtained by suppressing the torque T.

Figure 18:
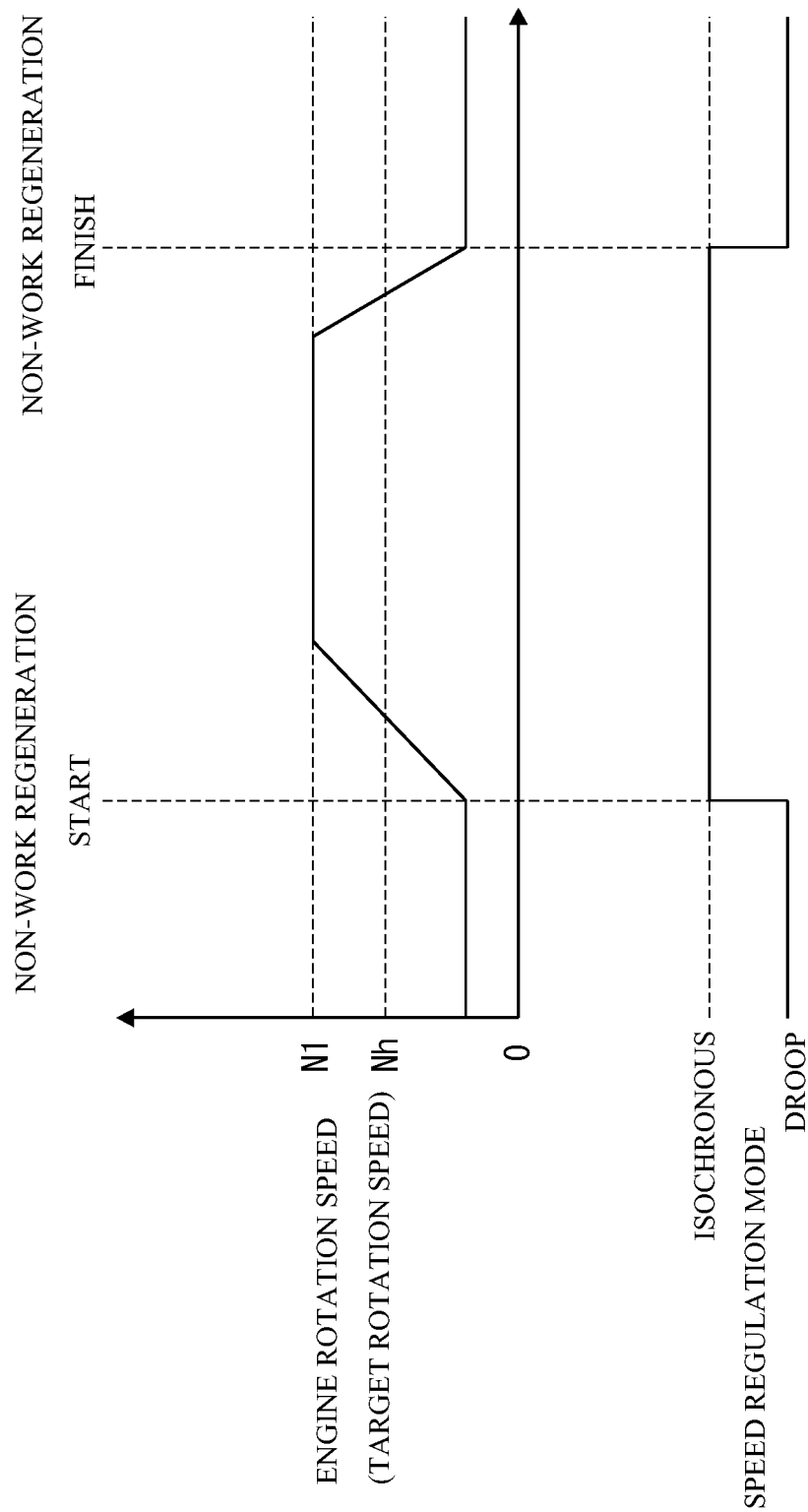
FIG. 18 is a timing chart showing a control operation at a time of executing a non-work regeneration control.

In the assist regeneration control and the reset regeneration control, in addition to the normal operation control, various works can be executed by transmitting the power of the engine 5, for example, to the moving portions of the working machine (the engine 5 can be driven in the normal operation). At this time, the engine controller 311 controls the driving of the engine 5 on the basis of the control mode (the droop control or the isochronous control) which is designated by the control mode selection switch 271. In the non-work regeneration control, since the engine 5 is driven at the high rotation speed exclusively for burning and removing the PM, for example, the moving portions of the working machine are not driven by the power of the engine 5. At this time, the engine controller 311 forcibly controls the driving of the engine 5 according to the isochronous control regardless of the control mode which is designated by the control mode selection switch 271, and drives the engine 5 at the predetermined high rotation speed N1, as shown in FIG. 18.

Next, a description will be given of an example of the regeneration control of the exhaust gas purification device 50 by the engine controller 311 with reference to flow charts in FIGS. 19 and 20. More specifically, an algorithm (a program) shown by the flow charts in FIGS. 19 and 20 is stored in the ROM of the engine controller 311, and each of the regeneration controls mentioned above is executed by reading the algorithm into the RAM and processing the algorithm by the CPU.

Figure 19:
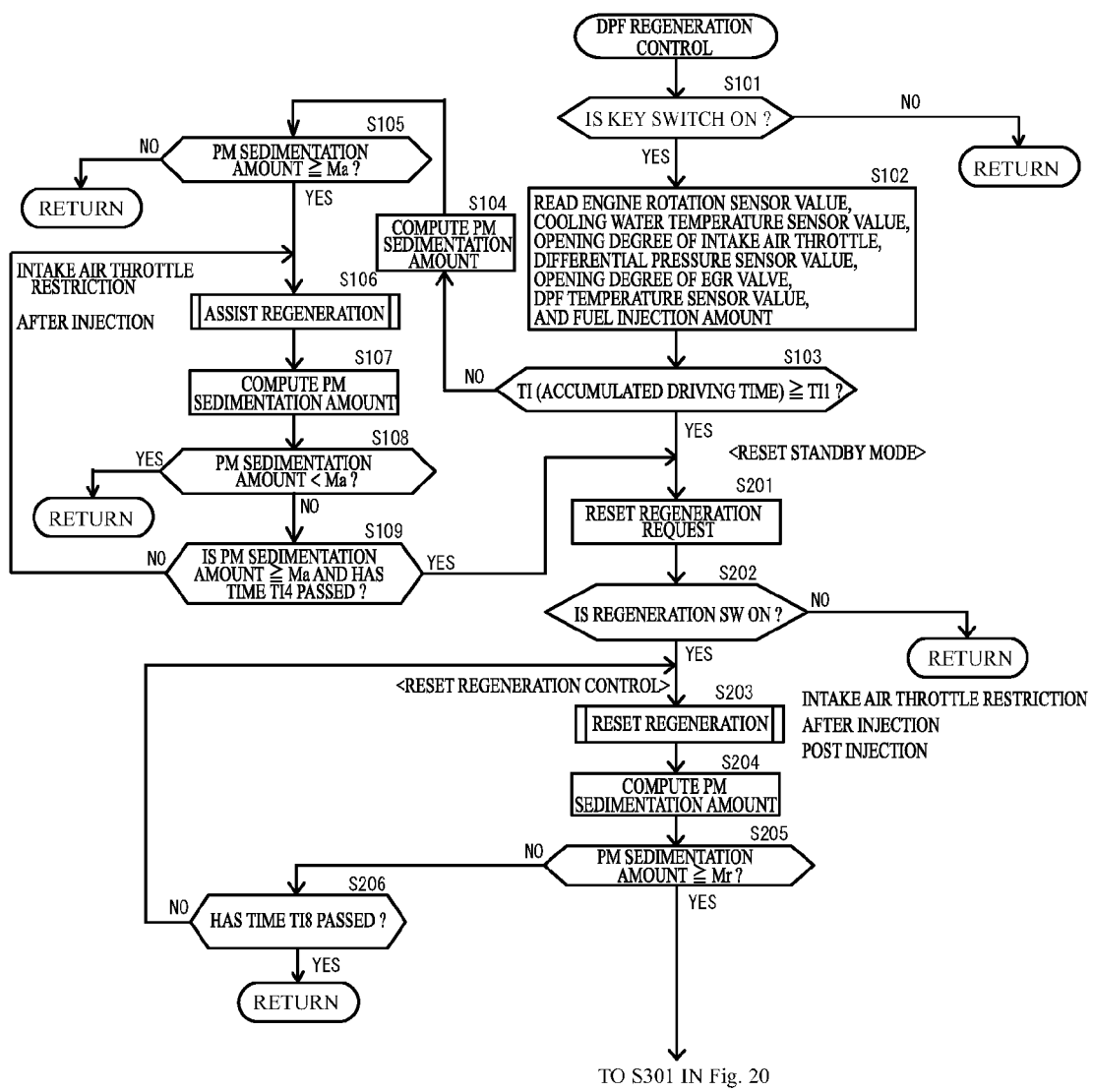
FIG. 19 is a flow chart of an assist regeneration control and a reset regeneration control.
Figure 20:
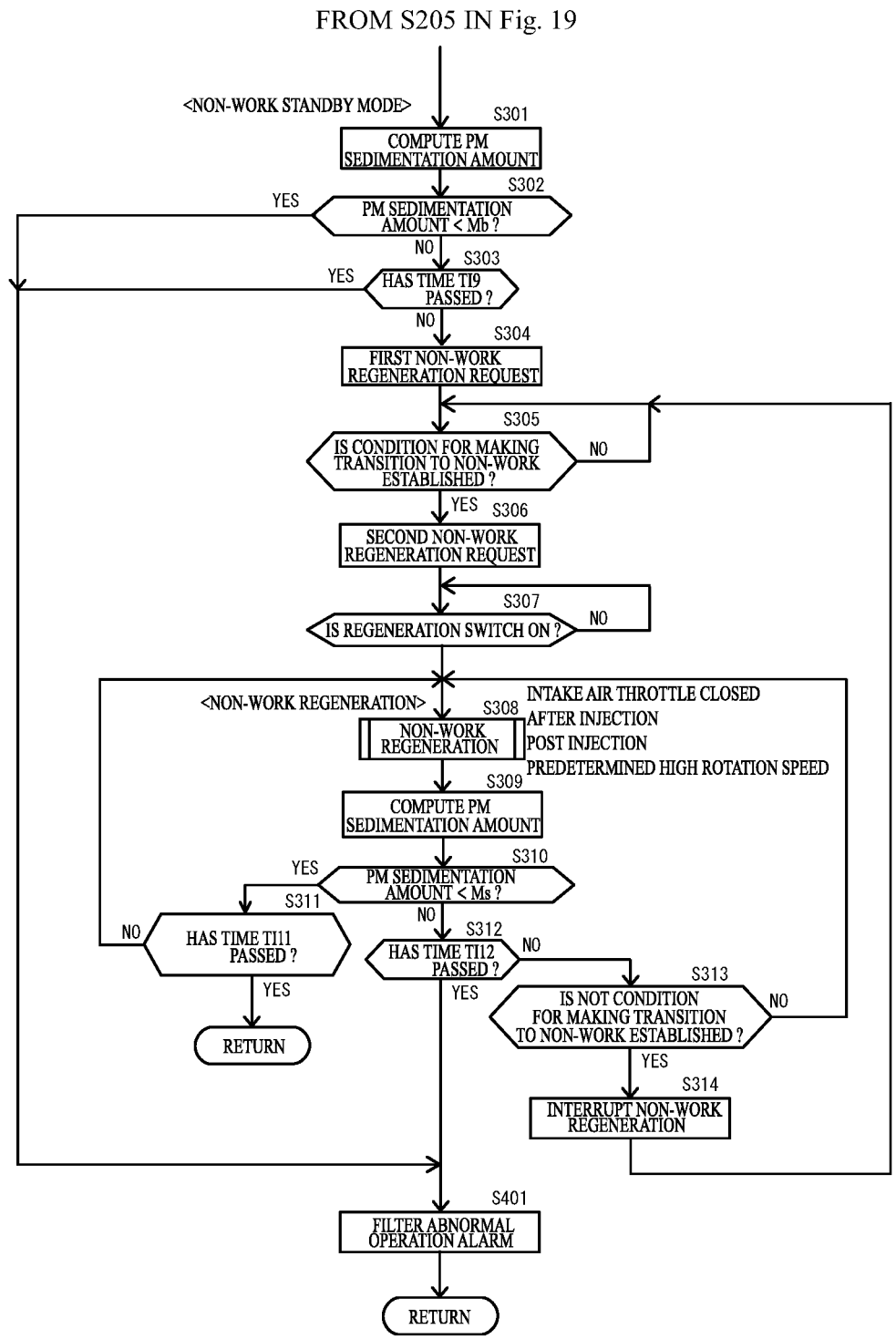
FIG. 20 is a flow chart of a non-work regeneration control.

As shown in FIG. 19, the regeneration control of the exhaust gas purification device 50 first of all reads detection values of the engine rotation sensor 322, the cooling water temperature sensor 323, the differential pressure sensor 325 and the DPF temperature sensor 326, the opening degrees of the intake air throttle member 78 and the EGR valve member 81, and the fuel injection amount by the common rail 341 (S102), if the key switch 201 is on (S101: YES). In other words, the engine controller 311 reads the detection values of the engine rotation sensor 322, the cooling water temperature sensor 323, the differential pressure sensor 325, and the DPF temperature sensor 326, the opening degrees of the intake air throttle member 78, and the EGR valve member 81, and the fuel injection amount by the common rail 341.

Next, if the accumulated driving time TI from the execution of the reset regeneration control or the non-work regeneration control in the past is less than the set time TI1 (for example, 50 hours) (S103: NO), the PM sedimentation amount within the exhaust gas purification device 50 is estimated (S104). The estimation of the PM sedimentation amount is carried out by using a P method which is based on the detection value of the differential pressure sensor 325 and the exhaust gas flow rate map, and a C method which is based on the detection value of the engine rotation sensor 322, the fuel injection amount, the PM discharge amount map, and the exhaust gas flow rate map. If the PM sedimentation amount is equal to or more than a specified amount Ma (for example, 8 g/l) (S105: YES), the assist regeneration control is executed (S106).

The PM sedimentation amount within the exhaust gas purification device 50 is estimated on the basis of the detection value of the engine rotation sensor 322, the fuel injection amount, the PM discharge amount map and the exhaust gas flow rate map, when the assist regeneration control is carried out (S107). If the PM sedimentation amount is less than the specified amount Ma (for example, 6 g/l) (S108: YES), the assist regeneration control is finished and turned back to the normal operation control. In the case that the PM sedimentation amount is equal to or more than the specified amount Ma (S108: NO), the step makes a transition to a step S201 which is a reset standby mode before the reset regeneration control in the case that a predetermined time TI4 (for example, 10 minutes) has passed in this state (S109: YES).

In the case that the step turns back to the step S103 and the accumulated driving time TI is equal to or more than the set time TI1 (S103: YES), the step makes a transition to a step S201 which is a reset standby mode, and a reset regeneration request is executed. In this stage, the regeneration lamp 332 and the regeneration switch lamp 345 blinks at a low speed (for example, 0.5 Hz), and the warning buzzer 331 intermittently sounds at a low speed (for example, 0.5 Hz). Therefore, the operator can immediately check the position of the regeneration switch 329 which is encouraged to be manually operated, by the regeneration control request alarm on the basis of the respective driving of the warning buzzer 331, the regeneration lamp 332 and the regeneration switch lamp 345.

Thereafter, in the case that the regeneration switch 329 is operated to be on for a predetermined time (for example, 3 seconds) (S202: YES), the reset regeneration control is executed (S203). In this stage, the engine controller 311 lights the regeneration lamp 332 and the regeneration switch lamp 345, and stops the sounding of the warning buzzer 331. As a result, the operator can easily view the matter that the reset regeneration control is under execution, by confirming the state of the regeneration switch 329 (the lighting of the regeneration switch lamp 345), and it can attract operator's attention.

In the case that the PM sedimentation amount is in a state of being less than a specified amount Mr (for example, 10 g/l) (S205: NO), by estimating the PM sedimentation amount within the exhaust gas purification device 50 during the execution of the reset regeneration control (S204), the reset regeneration control is finished and the control is returned to the normal operation if a predetermined time TI8 (for example, 30 minutes) has passed after the start of the rest regeneration control (S206: YES). At this time, the regeneration lamp 332 and the regeneration switch lamp 345 are turned off since the reset regeneration control is finished. On the other hand, if the PM sedimentation amount is equal to or more than the specified amount Mr (S205: YES), the reset regeneration control is assumed to fail, and there is fear that the PM excessive sedimentation may occur. Therefore, the step makes a transition to a step S301 which is a parking standby mode before the non-work regeneration control.

As shown in FIG. 20, the parking standby mode first of all estimates the PM sedimentation amount within the exhaust gas purification device 50 (S301). Further, if the PM sedimentation amount is less than a specified amount Mb (for example, 12 g/l) (S302: NO) and within a predetermined time TI9 (for example, 10 hours) (S303: NO), the first non-work regeneration request is executed (S304). In this stage, the regeneration switch lamp 345 remains turning off, however, the regeneration lamp 332 and the engine abnormal operation lamp 347 blink at a high speed (for example, 1.0 Hz), and the warning buzzer 331 intermittently sounds at a high speed (for example, 1.0 Hz). Therefore, the operator can recognize that establishment of a condition for making a transition to a non-work regeneration (an interlock cancel condition) is requested for executing the non-work regeneration control, by the regeneration control request alarm on the basis of the respective driving of the warning buzzer 331, the regeneration lamp 332, and the engine abnormal operation lamp 347.

On the other hand, in the case that the PM sedimentation amount is equal to or more than the specified amount Mb (S302: YES), or the predetermined time TI9 (for example, 10 hours) has passed under the parking standby mode (S303: YES), there is fear that the PM excessive sedimentation may occur. As a result, the abnormal operation of the exhaust gas purification device 50 is informed (STEP 401). At this time, the engine abnormal operation lamp 347 blinks at a high speed (for example, 1.0 Hz), and the warning buzzer 331 sounds at a high speed (for example, 1.0 Hz). On the other hand, the regeneration lamp 332, and the regeneration switch lamp 345 remain turning off.

After the first non-work regeneration request is executed in the step S304 mentioned above, the step waits until the previously set condition for making a transition to the non-work regeneration (the interlock cancel condition) is established (S305). The condition for making a transition to the non-work regeneration shown in the step S305 is constituted by conditions that the forward and backward movement potentiometer 211 is at a neutral position (a neutral state of the forward and backward movement switching lever 252), the parking brake switch 236 is in an on state (a lock state by the parking brake lever 254), the PTO clutch switch 225 is in an off state, the engine 5 is at a low idle rotation speed (a rotation speed which is the lowest limit at the no-loading time) NO, and the detection value of the cooling water temperature sensor 323 is equal to or more than a predetermined value (for example, 65° C.) (the warm-up operation of the engine 5 is finished).

If the condition for making a transition to the non-work regeneration (the interlock cancel condition) is established in the step S305 (YES), a second non-work regeneration request is executed (S306). In this stage, the regeneration lamp 332 and the regeneration switch lamp 345 blink at a low speed (for example, 0.5 Hz), the engine abnormal operation lamp 347 blinks at a high speed (for example, 1.0 Hz), and the warning buzzer 331 is switched to an intermittent low speed sounding (for example, 0.5 Hz). Therefore, the operator can immediately recognize the position of the regeneration switch 329 which is encouraged to be manually operated, at the same time of recognizing the establishment of the condition for making a transition to the non-work regeneration (the interlock cancel condition) by the regeneration control request alarm on the basis of the respective driving of the warning buzzer 331, the regeneration lamp 332 and the regeneration switch lamp 345. Further, since each of a blinking period of the regeneration lamp 332 and a sounding period of the warning buzzer 331 makes a transition to a low speed from a high speed, it is possible to securely make the operator recognize that the condition for making a transition to the non-work regeneration (the interlock cancel condition) is established.

Further, if the regeneration switch 329 is on for a predetermined time (S307: YES), the non-work regeneration control is executed (S308). More specifically, the engine controller 311 confirms that the on operation to the regeneration switch 329 is received from the operator, and executes the non-work regeneration control. In this stage, the regeneration lamp 332, the regeneration switch lamp 345, and the engine abnormal operation lamp 347 are lighted, and the warning buzzer 331 is stopped sounding at the same time. As a result, since the operator recognizes that the non-work regeneration control is executed, it is possible to inhibit an erroneous operation of the operator at a time of executing the non-work regeneration control.

The engine controller 311 forcibly executes the isochronous control which maintains the rotation speed of the engine 5 constant regardless of the load fluctuation of the engine 5, in order to exclusively drive the engine 5 for burning and removing the particulate matters just before the execution of the non-work regeneration control. In other words, as shown in FIG. 18, even in the case that the droop control is designated by the control mode selection switch 271, the engine controller 311 switches to the isochronous control and controls to drive the engine 5, when executing the non-work regeneration control. Therefore, since the engine 5 rotates while maintaining a predetermined high rotation speed N1 which is a parking time maximum output (for example, about 80% of the maximum output) which is lower than the maximum output when the non-work regeneration control is executed, it is possible to raise the temperature of the exhaust gas, the PM within the exhaust gas purification device 50 can be forcibly burned and removed under a favorable condition, and it is possible to regenerate the capacity of purifying the exhaust gas purification device 50.

Further, in the case that the non-work regeneration control is executed, the engine 5 is rotated at the predetermined high rotation speed N1, as shown in FIG. 18. Therefore, at a time of executing the non-work regeneration control, the engine 5 rotates at the predetermined high rotation speed N1 which is the parking time maximum output (for example, about 80% of the maximum output) which is lower than the maximum output, and can raise the temperature of the exhaust gas, the PM within the exhaust gas purification device 50 is forcibly burned and removed under the favorable condition, and it is possible to regenerate the capacity of purifying the exhaust gas purification device 50.

The PM sedimentation amount within the exhaust filter 202 is estimated during the execution of the non-work regeneration control (S309). If the PM sedimentation amount is less than a specified amount Ms (for example, 8 g/l) (S310: YES), and a predetermined time TI11 (for example, 30 minutes) has passed after the start of the non-work regeneration control (S311: YES), the non-work regeneration control is finished and turns back to the normal operation control. In the case that the PM sedimentation amount is equal to or more than the specified amount Ms (S310: NO), the non-work regeneration control is assumed to fail if a predetermined time TI12 (for example, 30 minutes) has passed in this state (S312: YES), so that there is fear that the PM excessive sedimentation may occur. As a result, the step makes a transition to a step S401 of informing of the abnormal operation of the exhaust gas purification device 50.

In a state in which the condition for making a transition to the non-work regeneration (the interlock cancel condition) is not established due to the cancel of the lock state by the parking brake lever 254, during the execution of the non-work regeneration control (S313: YES), the step makes a transition to a step S304 after the non-work regeneration control is interrupted (S314), and executes the first non-work regeneration request. In S312, the non-work regeneration control is determined whether or not it is interrupted, on the basis of the state in which the condition for making a transition to the non-work regeneration (the interlock cancel condition) is not established, however, the non-work regeneration control may be interrupted in the case that the regeneration switch 329 is depressed during the execution of the non-work regeneration control. As a result, it is possible to interrupt the non-work regeneration control of the exhaust gas purification device 50 without any troublesome operations such as the operation of stopping the diesel engine 1 and interrupting the non-work regeneration control of the exhaust gas purification device 50.

As mentioned above, in the present embodiment, the instruction of starting the regeneration control of the exhaust gas purification device 50 according to the manual operation of the operator is the operation of holding down the regeneration switch 329 (the operation of turning on for a predetermined time (for example, 3 seconds)). In other words, the regeneration control of the exhaust gas purification device 50 is structured such as to be started when the regeneration switch 329 is continuously operated for a time which is longer than the operation time which can determine whether the operation of the regeneration switch 329 is the manual operation of the operator or the erroneous operation. Therefore, it is possible to inhibit a regeneration control operation which is not expected by the operator.

Further, since the regeneration control of the exhaust gas purification device 50 is structured such as to be reset when the operator stops the diesel engine 1 by operating the key switch to turn off during the regeneration control of the exhaust gas purification device 50, and next restarts the diesel engine 1, it is possible to inhibit a regeneration control operation which is not expected by the operator.

When the regeneration control is carried out as mentioned above, the meter controller 312 controls the respective blinking operations of the parking brake lamp 346, the PTO lamp 348, the regeneration lamp 332, the engine abnormal operation lamp 347, and the reverser neutral lamp 349 by the display lamps 267a to 267d and 273 of the meter panel 246. Particularly, when executing the non-work regeneration control, the meter controller 312 blinks each of the parking brake lamp 346, the PTO lamp 348, and the reverser neutral lamp 349 in conformity to the non-established condition, in order to make the operator recognize the establishment of the condition for making a transition to the non-work regeneration.

Figure 21:
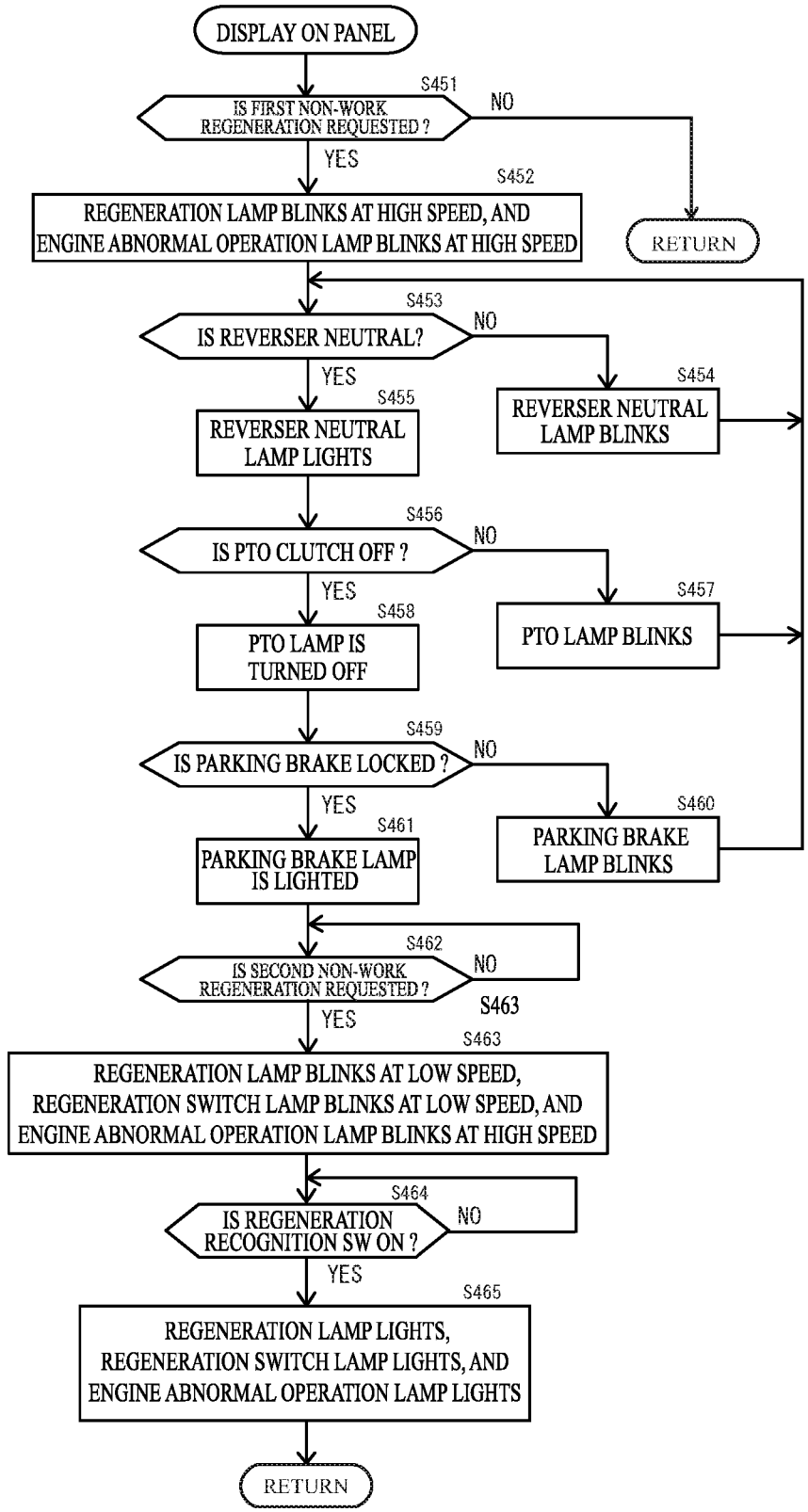
FIG. 21 is a flow chart showing a lamp display operation at the non-work regeneration control time.

A description will be given below of the display operation of the meter panel 246 at a time of executing the non-work regeneration control according to a flow chart in FIG. 21. The meter controller 312 blinks the regeneration lamp 332 and the engine abnormal operation lamp 347 at a high speed (S452) if the meter controller 312 receives the first non-work regeneration request from the engine controller 311 in the step S304 (S451: YES). Further, the meter controller 312 checks on the basis of the signal from the forward and backward movement potentiometer 211 whether or not the forward and backward movement switching lever 252 is in a neutral state, by communicating with the main machine controller 313 (S453).

Further, in the case that the forward and backward movement switching lever 252 exists in the forward travel side or the backward travel side (S453: NO), the reverser neutral lamp 349 is blinked together with the regeneration lamp 332 and the engine abnormal operation lamp 347 in order to encourage the operator to make the forward and backward movement switching lever 252 the neutral state (S454). At this time, a blinking period of the reverser neutral lamp 349 may be set to the same period of the blinking period of the regeneration lamp 332 and the engine abnormal operation lamp 347. On the other hand, in the case that the forward and backward movement switching lever 252 is at the neutral state (S453: YES), the reverser neutral lamp 349 is lighted (S455).

Next, the meter controller 312 communicates with the working machine controller 314 and checks on the basis of the signal from the PTO clutch switch 225 whether or not the PTO clutch switch 225 is in an off state (S456). In the case that the PTO clutch switch 225 is in an on state (S456: NO), the PTO lamp 348 is blinked together with the regeneration lamp 332 and the engine abnormal operation lamp 347 (S457). At this time, a blinking period of the PTO lamp 348 may be set to the same period as the blinking period of the regeneration lamp 332 and the engine abnormal operation lamp 347. On the other hand, in the case that the PTO clutch switch 225 is in an off state (S456: YES), the PTO lamp 348 is turned off (S458).

Next, the meter controller 312 communicates with the main machine controller 314, and checks on the basis of the signal from the parking brake switch 236 whether or not the lock state by the parking brake lever 254 is established (S459). In the case that the parking brake switch 236 is in an off state (S459: NO), the parking brake lamp 346 is blinked together with the regeneration lamp 332 and the engine abnormal operation lamp 347 in order to encourage the operator to set the lock state by the parking brake lever 254 (S460). At this time, a blinking period of the parking brake lamp 346 may be set to the same period as the blinking period of the regeneration lamp 332 and the engine abnormal operation lamp 347. On the other hand, in the case that the parking brake switch 236 is in an on state (S459: YES), the parking brake lamp 346 is lighted (S461).

Thereafter, if the meter controller 312 receives a second non-work regeneration request from the engine controller 311 in the step S306 mentioned above (S462: YES), the meter controller 312 blinks the engine abnormal operation lamp 347 at a high speed at the same time of blinking the regeneration lamp 332 and the regeneration switch lamp 345 at a low speed (S463). Further, the operation of holding down the regeneration switch 329 is determined to be carried out (S464), in the same manner as the step S307. At this time, if the regeneration switch 329 is on for a predetermined time (S464: YES), the regeneration lamp 332, the regeneration switch lamp 345, and the engine abnormal operation lamp 347 are lighted (S465).

Figure 22:
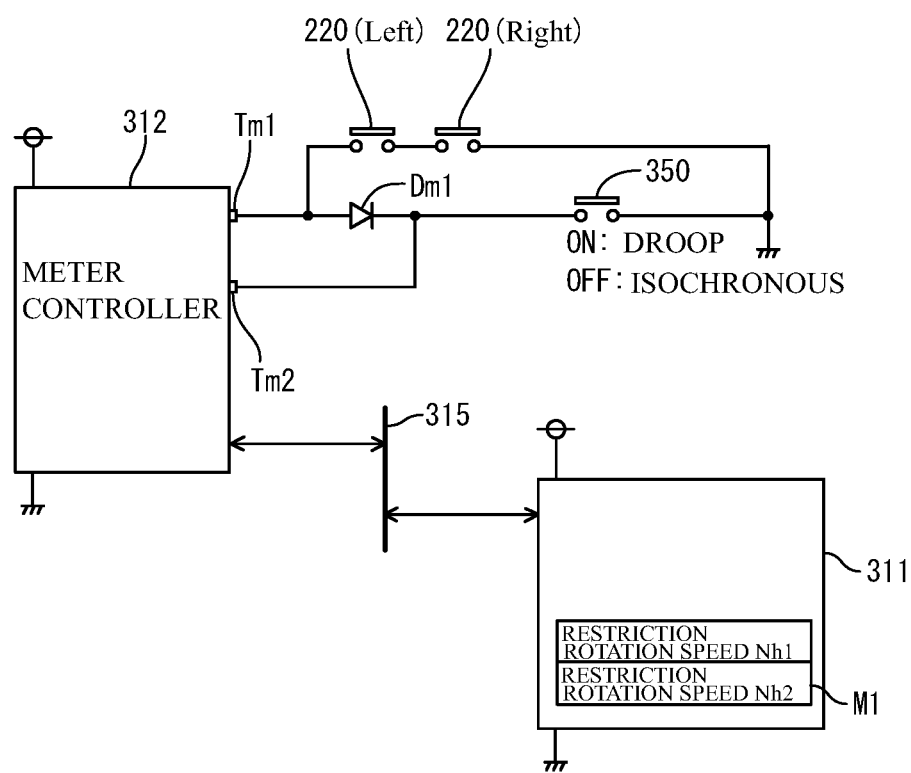
FIG. 22 is a second embodiment of the circuit block diagram.

FIG. 22 shows a second embodiment of the circuit block diagram. In the present embodiment, the meter controller 312 may be provided with a droop switching terminal (a control mode switching terminal) Tm1 and a high-idle switching terminal Tm2, as shown in FIG. 22. Further, the engine controller 311 stores in a memory M1 high-idle restriction rotation speeds Nh1 and Nh2. The engine controller 311 stores the high-idle restriction rotation speed Nh1 as a restriction rotation speed at the isochronous control time, and stores the high-idle restriction rotation speed Nh2 as a restriction rotation speed at the droop control time.

The droop switching terminal Tm1 of the meter controller 312 is connected to a cathode of a diode Dm1 for preventing backflow, and is grounded to an anode of the diode Dm1 via the control mode selection switch 350. The right and left brake pedal switches 220 and 220 are connected in series. Further, a series circuit by the brake pedal switches 220 and 220 is connected in parallel to a series circuit by the diode Dm1 and the control mode selection switch 350. A connection node between the anode of the diode D1 and the control mode selection switch 350 is connected to the high-idle switching terminal Tm2 of the meter controller 312.

The meter controller 312 informs the engine controller 311 via the CAN communication bus 315 of the drive control of the engine 5 according to the droop control method when the signal input to the droop switching terminal Tm1 is low (earth potential). Meanwhile, the meter controller 312 informs the engine controller 311 via the CAN communication bus 315 of the drive control of the engine 5 according to the isochronous control method when the signal input to the droop switching terminal Tm1 is high (power source potential).

The meter controller 312 informs the engine controller 311 via the CAN communication bus 315 of the restriction of the rotation speed of the engine 5 by the high-idle restriction rotation speed Nh1 stored in the memory M1, when the signal input to the high-idle switching terminal Tm2 is low. Meanwhile, the meter controller 312 informs the engine controller 311 via the CAN communication bus 315 of the restriction according to the high-idle restriction rotation speed Nh2 stored in the memory M1, when the signal input to the high-idle switching terminal Tm2 is high.

When the control mode selection switch 350 is turned on, the low signal is input to the droop switching terminal Tm1 of the meter controller 312. The meter controller 312 recognizes that the droop control method is designated, and informs the engine controller 311. At this time, the low signal is input to the high-idle switching terminal Tm2 of the meter controller 312. The meter controller 312 recognizes that the restriction by the high-idle restriction rotation speed Nh2 is designated, and informs the engine controller 311. Therefore, the engine controller 311 executes the high-idle restriction by the high-idle restriction speed Nh2 as well as controlling the engine 5 according to the droop control method.

When the control mode selection switch 350 is turned off, one of the right and left brake pedal switches 220 and 220 is off in the case that any one of the right and left brake pedals 251 and 251 is in a non-operated state. As a result, the high signal is input to the droop switching terminal Tm1 of the meter controller 312. The meter controller 312 recognizes that the isochronous control method is designated, and informs the engine controller 311. At this time, the high signal is also input to the high-idle switching terminal Tm2 of the meter controller 312. The meter controller 312 recognizes that the restriction by the high-idle restriction rotation speed Nh1 is designated, and informs the engine controller 311. Therefore, the engine controller 311 executes the high-idle restriction by the high-idle restriction speed Nh1 as well as controlling the engine 5 according to the isochronous control method.

When the control mode selection switch 350 is turned off, both of the right and left brake pedal switches 220 and 220 are turned on in the case that both of the right and left brake pedals 251 and 251 are operated. As a result, the low signal is input to the droop switching terminal Tm1 of the meter controller 312. The meter controller 312 recognizes that the droop control method is designated, and informs the engine controller 311. Meanwhile, the high signal is input to the high-idle switching terminal Tm2 of the meter controller 312. The meter controller 312 recognizes that the restriction by the high-idle restriction rotation speed Nh1 is designated, and informs the engine controller 311. Therefore, the engine controller 311 executes the high-idle restriction by the high-idle restriction speed Nh1 as well as controlling the engine 5 according to the droop control method. A coupling confirmation sensor informing of the coupling of the coupling member 241 to the locking member 242 may be provided, thereby allowing the right and left brake pedal switches 220 and 220 to be simultaneously turned on when making the engine controller 311 recognize that the coupling member 241 is coupled to the locking member 242.

Figure 23:
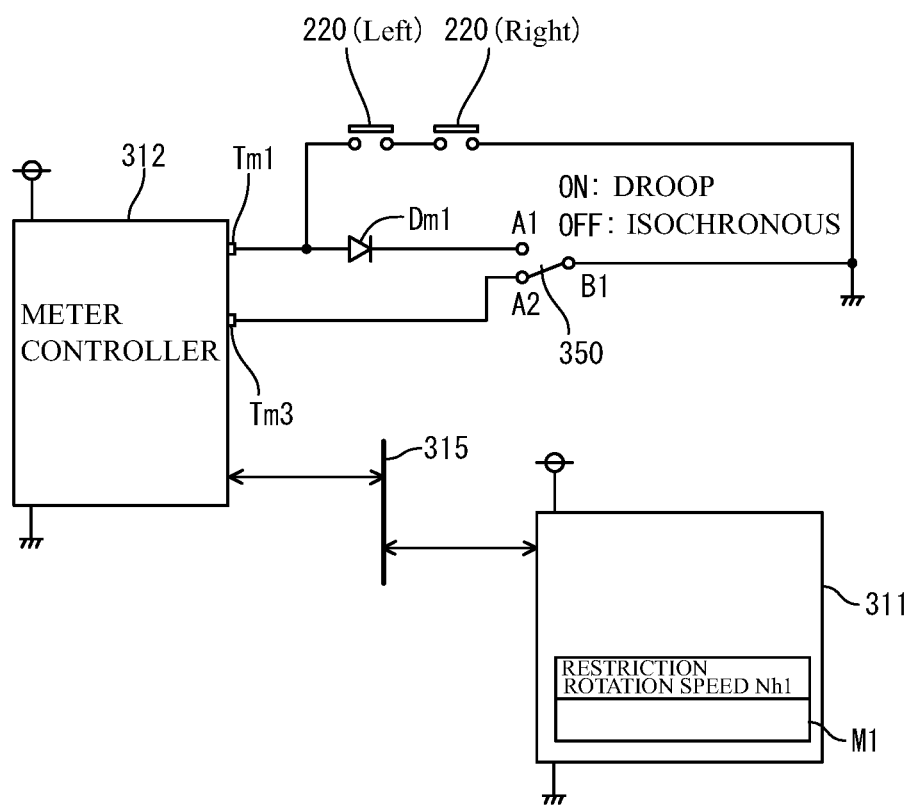
FIG. 23 is a third embodiment of the circuit block diagram.

FIG. 23 shows a third embodiment of the circuit block diagram. In the present embodiment, the meter controller 312 may be provided with the droop switching terminal (the control mode switching terminal) Tm1 and the high-idle restriction terminal Tm3, as shown in FIG. 23. Further, the engine controller 311 stores only the high-idle restriction rotation speed Nh1 in the memory M1. Further, the control mode selection switch 350 is a single pole double throw switch in which a common terminal B1 is grounded, a selection terminal A1 is connected to the cathode of the diode Dm1, and a selection terminal A2 is connected to the high-idle restriction terminal Tm3 of the meter controller 312. The anode of the diode Dm1 is connected to the droop switching terminal Tm1 of the meter controller 312, and the right and left brake pedal switches 220 and 220 are connected in series between the droop switching terminal Tm1 and the earth potential.

The meter controller 312 informs the engine controller 311 via the CAN communication bus 315 of the rotation speed of the engine 5 in order to make the restriction (the high-idle restriction) by the high-idle restriction rotation speed Nh1 stored in the memory M1 effective when the signal input to the high-idle restriction terminal Tm3 is low. On the other hand, the meter controller 312 informs the engine controller 311 via the CAN communication bus 315 in order to make the restriction (the high-idle restriction) by the high-idle restriction rotation speed Nh1 stored in the memory M1 ineffective, when the signal input to the high-idle switching terminal Tm2 is high.

When the control mode selection switch 350 is connected to the selection terminal A1 and is turned on, the low signal is input to the droop switching terminal Tm1 of the meter controller 312. The meter controller 312 recognizes that the droop control method is designated, and informs the engine controller 311. At this time, the high signal is input to the high-idle restriction terminal Tm2 of the meter controller 312. The meter controller 312 recognizes that the ineffectiveness of the high-idle restriction is designated, and informs the engine controller 311. Therefore, the engine controller 311 controls the engine 5 according to the droop control method, and makes the high-idle restriction by the high-idle restriction speed Nh1 ineffective.

When the control mode selection switch 350 is connected to the selection terminal A2 and is turned off, one of the right and left brake pedal switches 220 and 220 is turned off in the case that any one of the right and left brake pedals 251 and 251 is in the non-operation state. As a result, the high signal is input to the droop switching terminal Tm1 of the meter controller 312. The meter controller 312 recognizes that the isochronous control method is designated, and informs the engine controller 311. At this time, the low signal is input to the high-idle restriction terminal Tm3 of the meter controller 312. The meter controller 312 recognizes that the effectiveness of the high-idle restriction is designated, and informs the engine controller 311. Therefore, the engine controller 311 controls the engine 5 according to the isochronous control method, and makes the high-idle restriction by the high-idle restriction speed Nh1 effective.

When the control mode selection switch 350 is connected to the selection terminal A2 and is turned off, both of the right and left brake pedal switches 220 and 220 are turned on in the case that both of the right and left brake pedals 251 and 251 are operated. As a result, the low signal is input to the droop switching terminal Tm1 of the meter controller 312. The meter controller 312 recognizes that the droop control method is designated, and informs the engine controller 311. Meanwhile, the low signal is also input to the high-idle restriction terminal Tm3 of the meter controller 312. The meter controller 312 recognizes that the effectiveness of the high-idle restriction is designated, and informs the engine controller 311. Therefore, the engine controller 311 makes the high-idle restriction by the high-idle restriction speed Nh1 effective, as well as controlling the engine 5 according to the droop control method.

The embodiments of the present invention relates to a working vehicle such as a tractor for a farm work or a wheel loader for a civil engineering work.

What is claimed is:
1. A working vehicle comprising:
an engine which is mounted to a travel machine body;
a pair of right and left traveling portions which are rotated by a power of the engine;
a pair of right and left brake operation devices for respectively operating to brake the pair of right and left traveling portions;
an engine controller which controls driving of the engine; and
the engine controller selecting any of an isochronous control and a droop control so as to control the engine,
wherein the working vehicle has a control mode selection switch which can alternatively select the isochronous control and the droop control, and
wherein in the case that the isochronous control is designated by the control mode selection switch, the engine is controlled according to the isochronous control when one of the right and left brake operation devices is under a non-operation state, and the engine is controlled according to the droop control when both of the right and left brake operation devices are under an operation state.

2. The working vehicle according to claim 1,
wherein the engine controller stores a predetermined rotation speed in addition to a high idling rotation speed based on a rated rotation speed of the engine, and the engine controller sets the predetermined rotation speed to the high idling rotation speed in the case that the isochronous control is designated by the control mode selection switch and both of the right and left brake operation devices are under the operation state.

3. The working vehicle according to claim 1,
further comprising a meter controller which displays a driving operation condition of the travel machine body,
wherein the control mode selection switch is electrically connected to the meter controller, and an operation state of the brake operation device is informed the meter controller.

4. The working vehicle according to claim 3,
wherein the engine controller stores a first rotation speed as a high idling rotation speed for an isochronous control, and sets the high idling rotation speed of the engine to the first rotation speed in the case that the isochronous control is designated by an engine control selector switch via a driving controller.

5. The working vehicle according to claim 3,
further comprising a driving operation display device which is controlled by the meter controller and displays a driving operation condition of the travel machine body,
wherein the control mode selection switch is installed at a position which is outside the driving operation display device.

6. The working vehicle according to claim 3,
further comprising a forward and backward movement switching lever for operating to switch a traveling direction of the travel machine body to a forward travel and a backward travel, and an erroneous operation prevention body which covers the forward and backward movement switching lever from a lower side,
wherein the control mode selection switch is installed on the erroneous operation prevention body.

* * * * *